(12) United States Patent
Glein et al.

(10) Patent No.: US 7,178,111 B2
(45) Date of Patent: Feb. 13, 2007

(54) MULTI-PLANAR THREE-DIMENSIONAL USER INTERFACE

(75) Inventors: Christopher Alan Glein, Seattle, WA (US); Bojana Ostojic, Kirkland, WA (US); Jeffrey C. Fong, Seattle, WA (US); Kort Danner Sands, Seattle, WA (US); Mark R. Gibson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 108 days.

(21) Appl. No.: 10/909,838

(22) Filed: Aug. 3, 2004

(65) Prior Publication Data

US 2006/0031776 A1 Feb. 9, 2006

(51) Int. Cl.
*G06F 3/00* (2006.01)
(52) U.S. Cl. ............... 715/848; 715/782; 715/821; 715/836; 715/841
(58) Field of Classification Search ............... 715/848, 715/810, 811, 815, 836, 825, 841, 782, 821; 725/37, 39, 40, 46, 52
See application file for complete search history.

(56) References Cited

U.S. PATENT DOCUMENTS

| | | | | |
|---|---|---|---|---|
| 5,546,529 A | * | 8/1996 | Bowers et al. | 715/848 |
| 5,754,809 A | * | 5/1998 | Gandre | 715/782 |
| 5,812,134 A | * | 9/1998 | Pooser et al. | 715/848 |
| 5,861,822 A | * | 1/1999 | Park et al. | 341/22 |
| 5,956,035 A | * | 9/1999 | Sciammarella et al. | 715/815 |
| 6,229,542 B1 | * | 5/2001 | Miller | 715/782 |
| 6,260,192 B1 | * | 7/2001 | Rosin et al. | 725/39 |
| 6,473,751 B1 | * | 10/2002 | Nikolovska et al. | 707/3 |
| 6,690,391 B1 | * | 2/2004 | Proehl et al. | 715/720 |
| 6,819,344 B2 | * | 11/2004 | Robbins | 715/848 |
| 2003/0169298 A1 | * | 9/2003 | Ording | 345/810 |
| 2004/0155907 A1 | * | 8/2004 | Yamaguchi et al. | 345/810 |

OTHER PUBLICATIONS

Microsoft, Microsoft Word 2000, 1999, Microsoft Corporation, 9.0.6926 SP-3.*
James R. Osborn et al., "An Interface For Interactive Spatial Reasoning And Visualization", CHI '92, May 3-7, 1992, pp. 75-82.
S. Coco, et al., "A new interactive graphical user interface for 3D FE simulation of electromagnetic devices", Transactions on Engineering Sciences, vol. 31, 2001, pp. 195-203.

* cited by examiner

*Primary Examiner*—Tadesse Hailu
*Assistant Examiner*—Alvin H Tan
(74) *Attorney, Agent, or Firm*—Banner & Witcoff, Ltd.

(57) ABSTRACT

A 10-Foot media user interface is herein described. A computer user interface may be designed for primary use as a 10-Foot user interface, where a user controls the computer using a remote control device, instead of as a traditional 2-Foot user interface where the user controls the computer using keyboard and mouse from directly in from of the computer. The 10-Foot user interface uses 3D space and animations to more clearly indicate navigation and selection of items in the user interface to the controlling user. Use of three-dimensional space also increases the display screen real estate that is available for content items, and allows the media user interface to move unselected items out of primary view of the user. The user interface may animate movement in three-dimensions to allow the user to more easily conceptually follow navigation of the user interface.

28 Claims, 15 Drawing Sheets

MULTI-PLANAR THREE-DIMENSIONAL USER INTERFACE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to user interfaces of computer systems. More specifically, the invention provides a three dimensional space and enhanced-usability animations for a multi-planar user interface of a data processing device primarily intended for interaction by a user via a remote control or other extended control device.

BACKGROUND OF THE INVENTION

As technology development progresses, prices decrease, and computing power increases, e.g., memory, storage, processor speed, graphics, and the like, computers are more often used for special purposes instead of being used as a general purpose machine. For example, computers have replaced video cassette recorders (VCRs) in the form of a personal video recorder (PVR), able to record and pause live TV, something which a VCR could never do. As computers replace devices which are not inherently meant for a user to interact with in the same manner as a user might interact with a traditional PC, traditional user interfaces include perceived drawbacks making them unsuitable as user interfaces for these special purpose computers, and thus new user interfaces are needed to allow a user to efficiently utilize the new device.

In a conventional scenario a user might interact with a home PC or laptop via a keyboard and mouse for providing primary input to the PC, and via a display screen and speakers for receiving primary output from the PC (other input and output devices may be used, such as a video camera, printer, scanner, and the like, but such devices are generally used less often for secondary input and output). The keyboard, mouse, display screen and speaker are all typically placed within close proximity to the user, e.g., on a desk. The user interface of the PC's operating system is likewise designed under the expectation that the user will interact with the operating system using the proximately located keyboard, mouse, display device, and speakers. This traditional computer input/output configuration is colloquially referred to as a "2-Foot" user interface, because the user is primarily intended to interact with the PC from approximately 2 feet away from the input or output device, e.g., sitting at a chair in front of the desk on which the keyboard, mouse, display, and speakers are located.

However, the 2-Foot user interface does not provide the same level of usability to a user when implemented on a device not intended to be used with a 2-Foot interface, but rather is intended to be used or controlled via an infrared remote control or some other remote control device. Devices that are primarily intended to be used with a remote control device have a user interface colloquially referred to as a 10-Foot user interface, because the user is primarily intended to interact with the device from father away than 2 feet, and generally sits about 10 feet away from the output display screen attached to the device. Examples of devices that benefit from a 10-Foot user interface include PVRs and Media Center PCs. A Media Center PC is a data processing device with features that allow a user to watch and record TV, manage music and listen to the radio, play DVDs, organize photos, and perform other media related activities, primarily via interaction with a remote control device, e.g., at a similar distance as a user might watch TV in his or her home.

As will be appreciated, a 2-Foot user interface does not work as well when implemented on a device intended to have a 10-Foot user interface because text and graphics are usually too small to be effectively seen from the user's farther distance from the display device. While a first generation of 10-Foot user interfaces have been developed for existing devices, these first generation 10-Foot user interfaces have inherent usability deficiencies that hinder the user experience with the devices on which they are implemented. Thus, it would be an advancement in the art to provide an improved user interface for devices whose primary interaction by a user is via remote a remote control device.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is generally directed to a 10-Foot user interface for a computer system controllable by a remote control device such as an infrared remote control. The user interface displays a menu listing multiple menu items navigable and selectable by a user of the computer system using the remote control device. When the user selects one of the menu items, the user interface splits content onto two different planes in a three-dimensional space in which the user interface is drawn, and puts the selected menu item on a prominent first plane, and the unselected menu items on a less prominent second plane.

According to another aspect of the invention, a computer on which the user interface is executing may animate transitions from single plane to multi-plane views of the user interface. A user of the data processing system can control the data processing system with a remote control device, e.g., an infrared remote control. The computer has a processor configured, by executing software stored in memory, to provide the user interface as a three-dimensional user interface drawn on a display device connected to the computer system. The software stored in memory may include a user interface software module that provides the user interface in the three-dimensional space, where the user interface includes multiple menus navigable by the user using the remote control device. The software may also include an animation module which, under control of the user interface software module, provides a sequence of frames for an animation when the user selects an item from a menu. The animation sequence splits the menu items of the menu from which the user selected an item between a two planes in the three-dimensional space, and animates the first and second planes moving away from each other in the three-dimensional space.

According to another aspect of the invention, a computer readable medium stored computer executable instructions for performing a method of providing a user interface. The method includes generating a three-dimensional graphical space for providing a user interface of a data processing device, and displaying on a display device connected to the data processing device a first list of a plurality of menu items selectable by a user navigating the user interface using a remote control device. When the user selects one of the menu items, the user interface displays the selected menu item on a first plane in the three-dimensional graphical space, and displays the other menu items on a second plane in the three-dimensional graphical space. The user interface then animates the two planes moving away from each other in the three dimensional space such that, when the animation is completed, the first plane has a more prominent display position than the second plane in the three-dimensional space in which the user interface is drawn.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
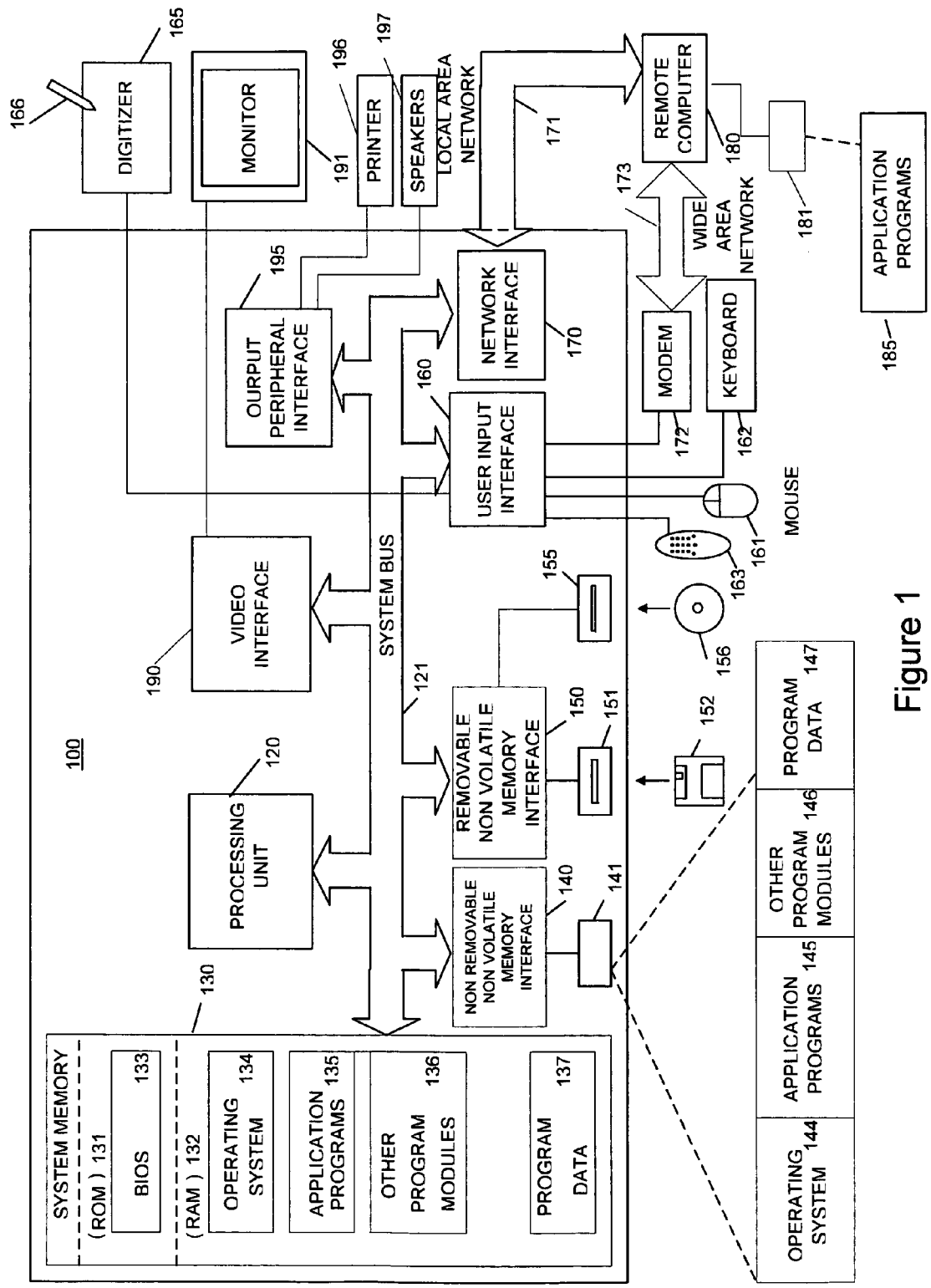
FIG. 1 illustrates a general operating environment suitable for implementation of a media user interface according to an illustrative embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device (e.g., a TV) is also connected to the system bus 121 via an interface, such as a video interface 190. In addition to the monitor, computers may also include other peripheral output devices such as speakers 197 and printer 196, which may be connected through an output peripheral interface 190.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. Further, the system may include wired and/or wireless capabilities. For example, network interface 170 may include Bluetooth, SWLan, and/or IEEE 802.11 class of combination abilities. It is appreciated that other wireless communication protocols may-be used in conjunction with these protocols or in place of these protocols.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are illustrative and other means of establishing a communications link between the computers may be used.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments of the Invention

In addition to the above, computer 110 may additionally be configured with a TV tuner card, and computer 110 may be controllable by a remote control device 163, such as an infrared remote control. The remote control device 163 may be configured with a plurality of input, e.g., buttons, keys, touchpad, finger pointing device, scroll control, etc., each configured to send a unique command to the computer 110 via an infrared control signal. Remote control 163 may be configured to provide navigation buttons (e.g., left, right, up down, forward, back, etc.), selection buttons (e.g., primary select, secondary select, enter, escape, cancel, etc.), alpha-numeric input buttons (e.g., 1, 2, . . . , 9, 0, A, B, C, etc.), application buttons to launch certain applications or navigate to a certain type of data (e.g., Internet Explorer, Music, TV, Photos, etc.), as well as conventional remote control inputs (e.g., channel up, channel down, volume up, volume down, etc.).

Computer 110 may be configured with a media mode of operation in which a user interacts with computer 110 using remote control device 163 and a so-called "10-Foot" user interface displayed on TV 191. The media mode of operation may allow a user to watch or record TV, watch a DVD, listen to music (via digital music file or via radio or optical disc), review and/or edit digital photos, and perform other media-related operations. Because a user of the media mode of operation will often be sitting farther than a user would sit to interact with the computer 110 in its normal mode of operation, the user interface of the media mode of operation should provide features that sufficiently convey receipt of remote control user input back to the user, and convey navigation of the user interface to the more distantly located user. That is, the display of the user interface should not only be easily recognizable when a user is sitting directly in front of the computer monitor (e.g., about 2 feet away, as with a conventional 2-Foot user interface), but should also be clearly recognizable and usable when the user is controlling the user interface from farther away (e.g., about 10 feet) using the remote control device 163. For example, a 10-Foot user interface typically has less information on the screen at one time than a 2-Foot user interface because of the distance through which the user is interacting with the user interface. That is, the information on the screen must be larger so that the user can see the user interface from farther away. Because the information on a 10-Foot user interface is typically larger than the same information displayed on a 2-Foot user interface, less information fits in the same amount of display screen real estate. The 10-Foot user interface of the media mode of operation is referred to herein as the media user interface.

According to an aspect of the invention, in order to convey a sense of depth to a user of the media user interface, the media user interface may be constructed in a three-dimensional space. That is, while the media user interface might be displayed on a two-dimensional display device such as a monitor or TV, the media user interface may be constructed in a 3D graphical space having X, Y, and Z dimensions, as well as have an alpha channel, α, to provide transparency according to certain features of the media user interface (described further below). Using the Z-dimension allows the media user interface to have more information on the screen while still providing the information in a large enough size to be visible from father away than a traditional 2-Foot user interface, because information can be presented with varying Z-values, as well as with varying X and Y values.

According to another aspect of the invention, in order to provide fluidity between the various displays of the media user interface based on user inputs, the media user interface may be animated. Because the user of the media user interface is typically going to be located farther from the screen than a 2-Foot user interface, it is generally more difficult for a user to see smaller details on the user interface. Instead of instantly changing from one menu to the next, or from one menu item selection to the next, either of which a user might miss if not paying careful attention, animation may be used to illustrate to the user the result of his or her user input, or the changing of one menu to the next, thus making it easier for the user to conceptually follow his or her navigation through the media user interface. Furthermore, animation may be used to provide feedback that a user has performed some action on the user interface, such as (a) moving focus from one menu selection to another or (b) selecting an item from a menu.

In order to provide three-dimensionality and animations, the media user interface may be developed using any software package that provides three-dimensionality and graphics acceleration, such as the DirectX® 9.0 software development kit with DirectX 9.0b runtime, available from Microsoft Corporation of Redmond, Wash. The underlying software architecture is secondary to the services it provides the media user interface. Microsoft's DirectX® is a suite of multimedia application programming interfaces (APIs) built into Microsoft's Windows® operating systems, and provides a standard development platform for Windows-based PCs by enabling software developers to access specialized hardware features without having to write hardware-specific code. The APIs act as a bridge for the hardware and the software to communicate. The DirectX® APIs give multimedia applications access to the advanced features of high-performance hardware such as three-dimensional (3-D) graphics acceleration chips and sound cards. The APIs also control low-level functions, including two-dimensional (2-D) graphics acceleration; support for input devices such as joysticks, keyboards, and mice; and control of sound mixing and sound output. Versions of DirectX® prior to versions 9.0 may also or alternatively be used.

Figure 2:
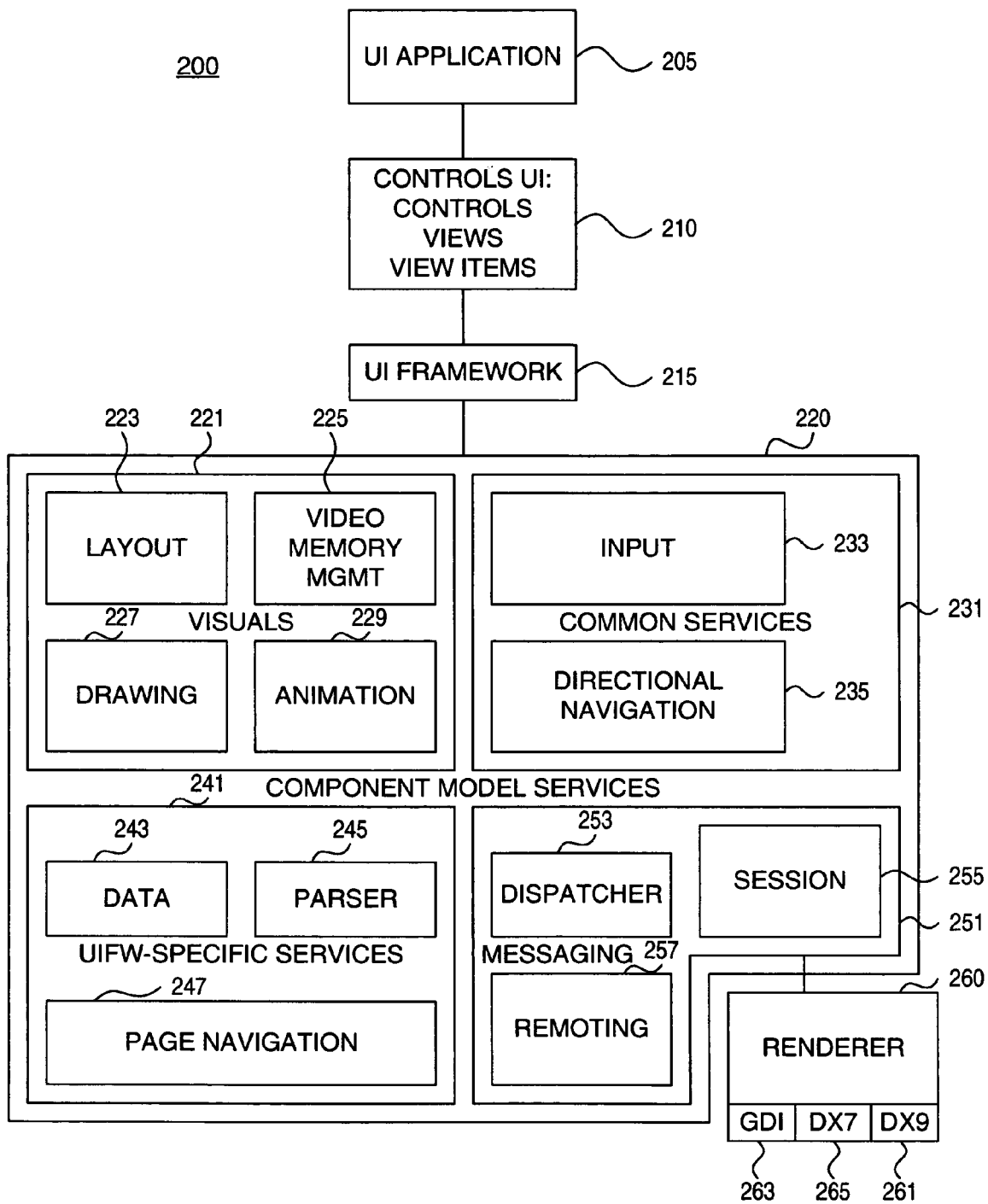
FIG. 2 illustrates a user interface infrastructure that may be used to support a media user interface according to an illustrative embodiment of the invention.

While the specific software architecture will vary from system to system, an illustrative media center interface infrastructure 200 will now be described with reference to FIG. 2. The reference to the specific media user interface infrastructure is not intended to limit the invention to the use of a specific infrastructure such as the infrastructure 200 nor to a specific software package such as DirectX®. The illustrative infrastructure 200 of FIG. 2 is provided merely as an example of how a media user interface infrastructure may be designed. The infrastructure used is a secondary consideration behind the actual operation and features of the resulting media user interface described below beginning with FIG. 3.

Infrastructure 200 may include a top level media user interface application 205, a controls interface 210, a UI framework 215, component model services 220, and renderer 260. UI application 205 is the top level control application that manages operation of the media user interface by calling control routines and the UI framework based on a user's interaction with the media user interface. The operation of the application 205 will be discussed further below. The remaining infrastructure will now be described from the bottom up.

Renderer 260 draws the end result media user interface to video memory. The renderer may run on its own thread, and receives information from the UI framework 215 regarding what to draw. A unit of drawing for the renderer may be referred to as a Visual. Visuals may be arranged in a tree that describes painting order and containership. Visuals may also contain content to be drawn, such as an image, text, color, etc. There may be a Visual object in UI framework 215 corresponding to each renderer Visual so that the UI framework 215 can tell the renderer 260 what to draw. Renderer 260 may include or communicate with rendering modules 261, 263, 265 depending on the graphical development application used for the media user interface, DirectX® 9, GDI, or DirectX® 7, respectively.

Component model services 220 may include four primary service modules: Visuals 221, Common Services 231, UI Framework-specific (UIFW) services 241, and messaging and state services 251. Messaging and state services are managed by dispatcher 253 and UI Session 255. Similar to a standard Windows® message queue, dispatcher 253 manages all processing time requests for components in the shell for the media mode of operation that is the platform for all the 10-Foot user interface experiences. The UI infrastructure components run as part of the shell process. However, dispatcher 253 may be extensible to allow the creation and expression of new priority rules as needed, e.g., to allow a new rule that runs a particular task after all painting tasks but before any timer tasks. UI Session 255 is a state container that manages all the data related to a set of objects. UI session 255 manages data, while dispatcher 253 manages timing. Other services of infrastructure 200, e.g., renderer 260, layout 223, drawing 227, etc., may store their data as sub-objects on the session 255. Session 255 may create a port to communicate with each service so that each service can refer to its portion of the data to handle its own tasks.

Remoting 257 is responsible for rendering the user interface on a remote device at high fidelity, if desired. Remoting is optional, and is not required for rendering the user interface on a directly or indirectly connected monitor or TV.

Visual services 221 may include layout services 223, video memory management 225, drawings services 227, and animation services 229. Layout services 223 positions the Visuals prior to rendering by the UI framework 215 and renderer 260. Video memory mgmt 225 manages data and instructions that go to the video card, including, e.g., management of surfaces, vertex buffers, and pixel shaders. Drawing services 227 manages any non-animated visual component to be drawn on the user interface, including text. Animation services 229 include a portion used by the component model 220 and a potion used by renderer 260. The component model portion builds an animation template that specifies an object, a destination, a timer-period, an animation method, stop points, and any other necessary animation data. The template may include Keyframes that describe a value for some point in time and the manner in which to interpolate between that keyframe and the next defined keyframe. The renderer then plays the template, at which time the animation services builds an active animation, which the rendered 260 executes per frame to move the Visuals on the screen.

Non-visual common services 231 may include input services 233 and directional navigation 235. Input services 233 manage a state machine that determines how to process input (remote control navigation, click down/up, mouse moves, etc.) to a specific view of the media user interface. Directional navigation services 235 identify a same-page move destination based on a center point of a current screen selection, other targets on-screen, and direction indicated by the user.

UIFW services 241 may include data services 243, parsing services 245, and page navigation services 247. Data services 243 provide data sources for objects, manage binding according to predetermined binding rules, and allow variables to reference data to be defined as needed. For example, data services 243 may be used to associate a photo item's display name property with a thumbnail button's Text View Item Content property so that when a property on one of the objects is set or changes, the related property on the other object is set or changes as well. A relationship need not be one-to-one. When a value on a bound object changes, the binding is marked "dirty" and, at some later time, the dispatcher 253 will call a process to reevaluate dirty bindings, causing data services 243 to propagate new values to each dirty binding's destination. Parsing services 245 parse XML descriptions of the media user interface. That is, XML may be used to create visual aspects of the media user interface, in addition to hand-authoring visual aspects of the media user interface in C, C++, and/or C#. Page navigation services 247 identify inter page navigations based on a selected content item.

UI Framework 215 provides an abstraction layer between the application 205 and component model 220. Controls user interface 210 manages the operation of items displayed on the display screen. That is, simply drawing a button on a screen does not inherently make the user's selection of that button result in an action. The controls user interface 210 manages the actual operation of items, such as buttons, radio lists, spinner controls, and the like, as well as views and view items. A Control is something on the media user interface that the user can interact with, handling input, focus, and navigation. A View is an owner of the display of a Control. The View requests that a Visual of the Control be drawn on the screen. That is, the View causes a visual representation of the Control to be displayed as part of the media user interface. A View may manage Visuals by creating a tree of ViewItems. A ViewItem stores content to draw (i.e., a Visual), as well as logic for how that content gets used (e.g., as a Control or as part of an animation).

The above infrastructure provides a managed UI description layer on top of a rendering system whose basic unit is the Visual, as discussed above. Visuals may be represented as tree nodes that establish containership for transforms. The managed layer (the component model) creates a higher level programming interface for the rendering system. The infrastructure may use objects to describe images, animations, transforms, and the like, using XML and/or source code written in a language such as C, C++, or C#. Those of skill in the art will appreciate that the underlying UT infrastructure is secondary to the services it provides.

Using the aforementioned infrastructure and the services the infrastructure provides, the UI application 205 (i.e., the managed description layer) provides the routines and definitions that make up, define, and control the operation of the media user interface. An illustrative media user interface provided by UI application 205 will now be described with further reference to FIGS. 3–31.

Media user interface start page 300 may include a plurality of high level menu selections 301, a list (of text, icons, graphics, etc.) of most recently used (MRU) items 303, a power menu icon 305, and a clock. High level menu selections may include options for Online Spotlight, My Pictures, My Videos, My TV, My Music, My Radio, My Programs, My Tasks, and Settings. Other high level selections may also or alternatively be included. MRU list 303 may at all times correspond to a currently highlighted menu selection item 307, as indicated by a selection cursor 309. That is, MRU list 303 may include up to the three most recent user-selected media items 303a, 303b, and 303c corresponding to the currently highlighted menu selection item 307. For example, when the My TV menu item is highlighted, the MRU items might include media selections for DVD, TV, or Movies; when the My Music menu item is highlighted, the MRU list might include the three most recent songs played by the user; when the My Radio menu item is highlighted, the MRU list might include the three most recent radio stations listed to by the user; etc. As the user moves the control cursor 309 over a new menu item, the UI application refreshes the MRU list 303 to correspond to the newly highlighted menu item. If the user has never selected three media items corresponding to the current item 307, the UI application 205 may alternatively cause the media user interface to display default items or action, or no items at all in the MRU list 303. According to an aspect of the invention, the MRU list might contain icons or graphics, or text, or a combination of the two. Icons are preferably used, with or without text, as visual stimulation is more easily perceived and recognized from distances (such as are typical in use with a 10-Foot user interface) than is text. In order to perceive and recognize text at the same distance, the text would necessarily be quite large and take up more display real estate than is necessary for graphics or icons. Thus, a combination of text and graphics suits the media user interface for use as a 10-Foot user interface as well as a 2-Foot user interface.

Power icon 305 launches a power sub-menu, described further below with respect to FIGS. 15–18.

Figure 4:
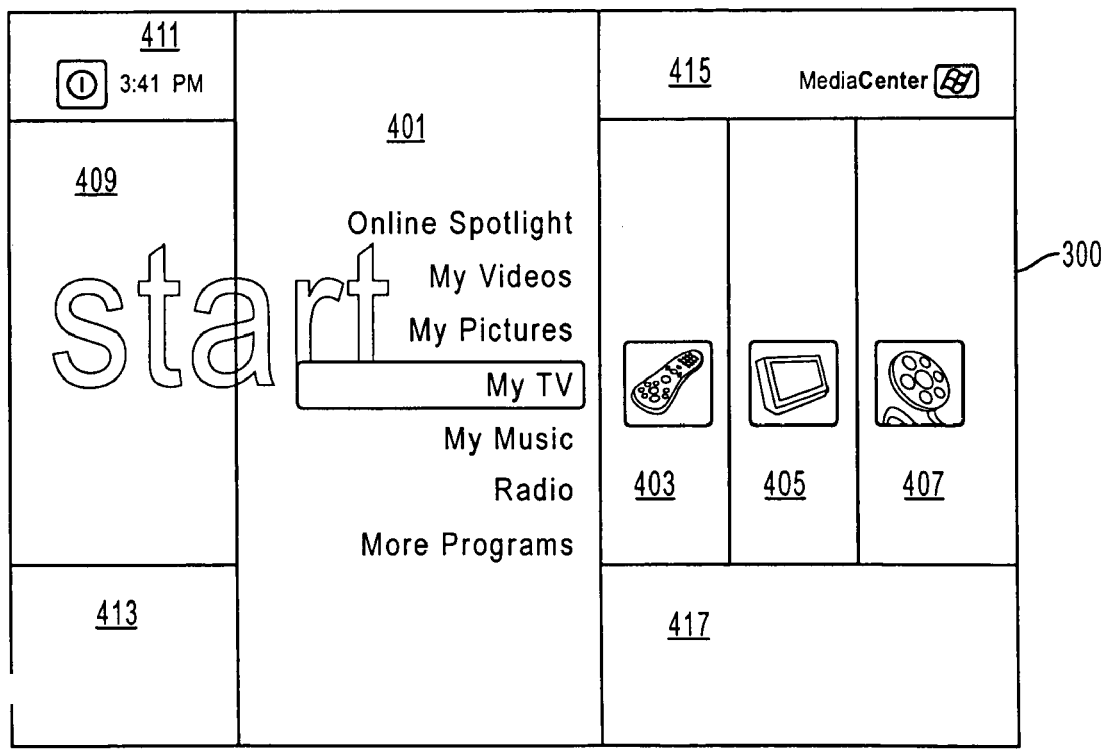
FIG. 4 illustrates control zones of the start menu illustrated in FIG. 3 according to an illustrative embodiment of the invention.

FIG. 4 illustrates zones 401–417 of the media user interface 300 selectable by a user using remote control device 163. The user, using up, down, left, and right navigation buttons on remote control device 163, can navigate to each zone when selectable content is displayed in each zone. Zone 401 includes menu items selectable by the user; zone 403 includes a first MRU item selectable by the user; zone 405 includes a second MRU selectable by the user; zone 407 includes a third MRU item selectable by the user; zone 409 include action buttons corresponding to currently highlighted selection item 307; zone 411 includes system controls, e.g., the power menu icon 305; zone 413 may include a selectable content item indicating a currently occurring action, such as a currently playing song (see, e.g., FIG. 5). Each zone may be set to include selectable items or not, depending on currently selected items, currently occurring actions (such as a song or radio station currently playing). When the MRU list contains one or more items, the user can navigate and select the MRU item displayed in zone 403, 405, or 407, depending on whether one, two, or three MRU items are available, respectively.

Figure 5:
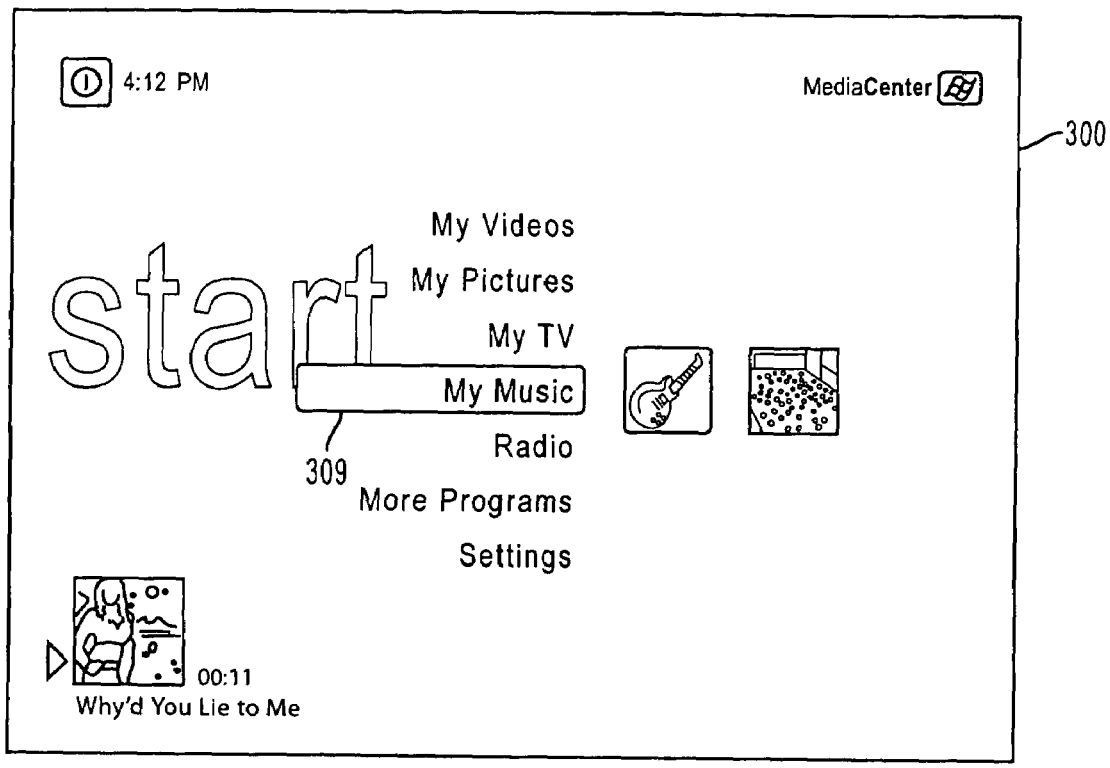
FIG. 5 illustrates the start menu illustrated in FIG. 3 when a different menu item is highlighted by the selection cursor according to an illustrative embodiment of the invention.

With further reference to FIG. 5, as a user scrolls through menu items 301, the menu items animatedly scroll up or down, while the selection cursor 309 remains fixed in the same position. When the user presses the down navigational button on remote control 163, the content shifts up; when the user presses the up navigational button on remote control 163, the content shifts down. For example, to navigate from the media user interface shown in FIG. 3 to the media user interface shown in FIG. 5, the user need only press the down navigation button on remote control device 163. When the user presses the down navigation button, the media user interface animates through a series of intermediate frames from the view shown in FIG. 3 to the view shown in FIG. 5, shifting content as appropriate.

While the media user interface is idle, i.e., the user is not inputting anything, the selection cursor 309 may be accentuated, e.g., by appearing to glow or pulsate, to indicate to the user the currently highlighted menu item, as well as to indicate that the computer has not frozen (i.e., crashed). This is especially useful for use with a 10-Foot user interface because, due to the distance from which a user might interact with the interface, the user can more easily lose track of the cursor if the cursor is not big enough or prominent enough for the user to track. When the user selects the highlighted item, the selection cursor 309 may flash or provide some other visual indication that the user has provided input. An audio signal may also or alternatively be used to provide selection feedback to the user.

Figure 3:
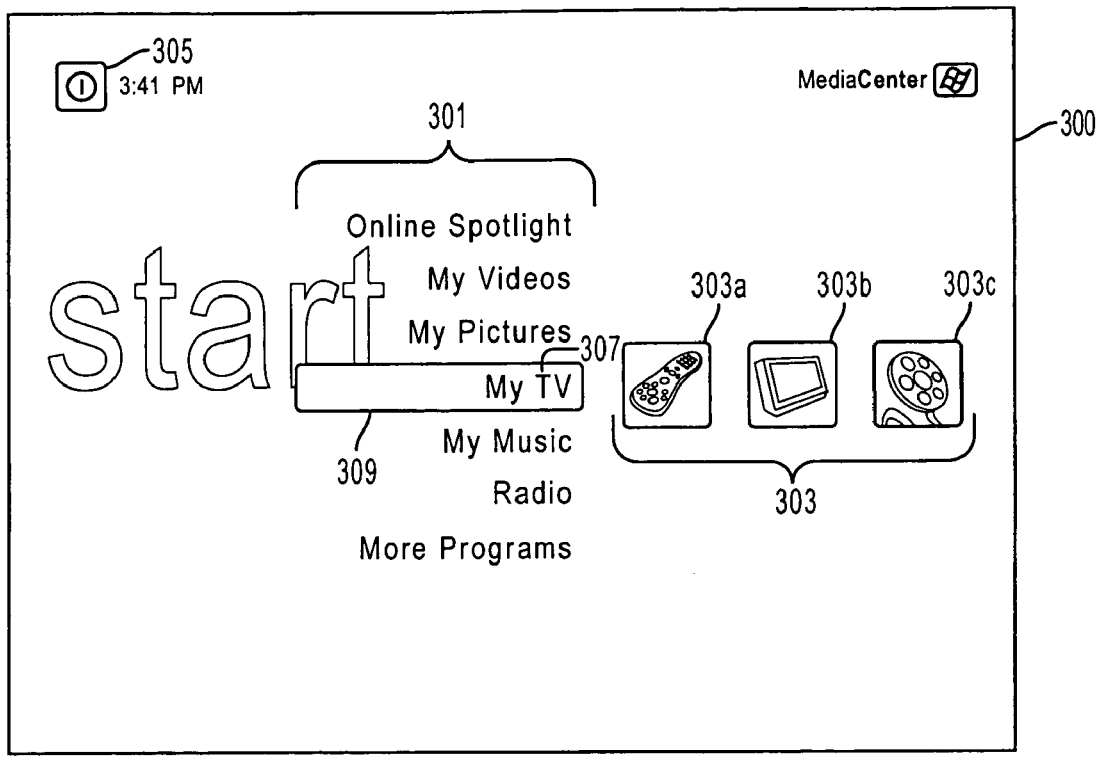
FIG. 3 illustrates a start menu of a media user interface according to an illustrative embodiment of the invention.
Figure 13:
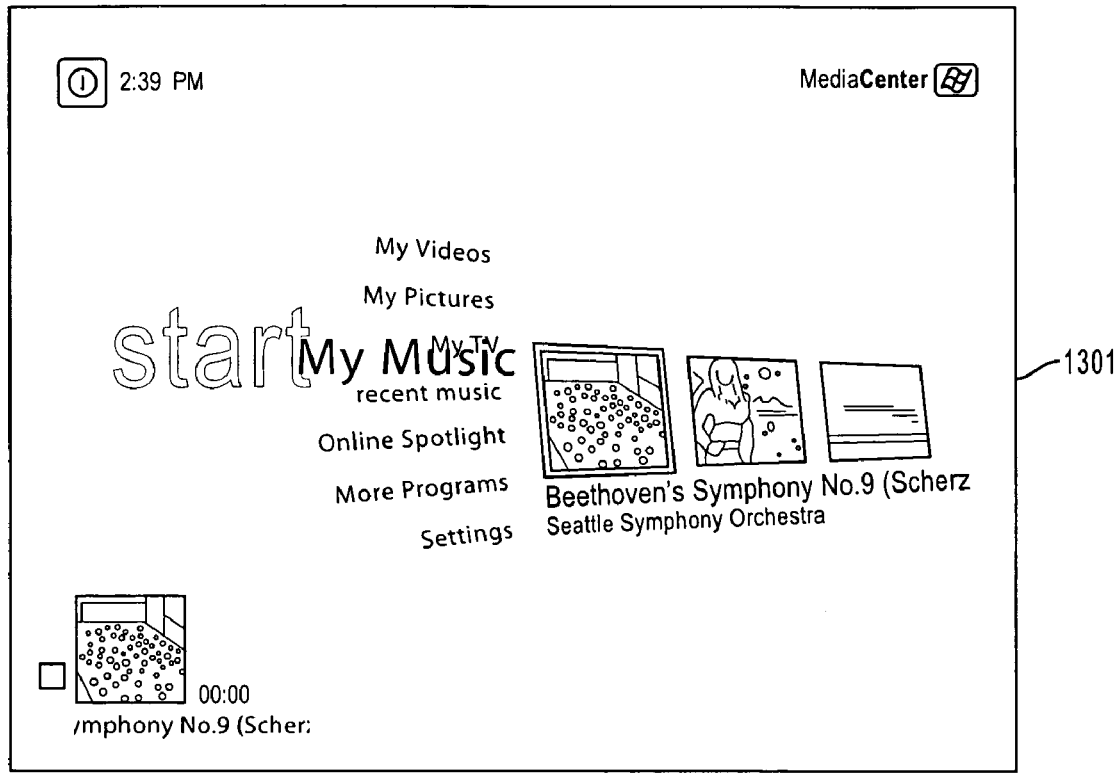
FIG. 13 illustrates a final frame of a MRU list tilt animation according to an illustrative embodiment of the invention.

As discussed above, when the user navigates from one menu item in list 301 to another, the MRU list refreshes itself to contain the new MRU list items corresponding to the item to which the user has navigated. According to an aspect of the invention, the MRU list may refresh itself in using a variety of animations. In one embodiment, the MRU list 303 might be animated with menu list 301, except that the MRU list items corresponding to the item from menu list 301 from which the user is navigating away slowly fade from view as they move away, and the MRU list items corresponding to the item from menu list 301 to which the user is navigating slowly fade into view as they move to their final positions on media user interface 300. While menu items remain visible as they move above or below the selection cursor 309, the MRU list items do not. For example, suppose a user navigates from the My TV menu item as shown in FIG. 3 to the My Music menu item as shown in FIG. 5. In order to navigate from My TV to My Music, the user selects the down navigation key on the remote control or keyboard to send a navigate down command to the UI application. When the UI application receives the navigate down command from the state shown in FIG. 3, the UI application 205 animates the menu items sliding up to shift the My Music menu item within the selection cursor 309, also fading the My Videos menu item partially from view, and fading the More Programs menu item fully into view as part of the animation. Also as part of the animation, the Online Spotlight menu item disappears completely from view, and the Settings menu item comes partially into view. Simultaneous with the animated sliding of the menu items, the My TV MRU list items move up with the My TV menu item. However, the My TV MRU list items fade from view from top to bottom, consistent with their movement upward as they move from their original positions, thus graphically simulating the MRU list items passing under a cover gradually increasing opaqueness from fully transparent to fully opaque. Similarly, as the My Music MRU list items come into view from below the My TV MRU list items, they fade into view as if coming out from underneath a cover, gradually increasing transparency from fully opaque to fully transparent. This same effect may be used with the MRU list items in focus, as shown in FIG. 13 (described below).

Figure 6:
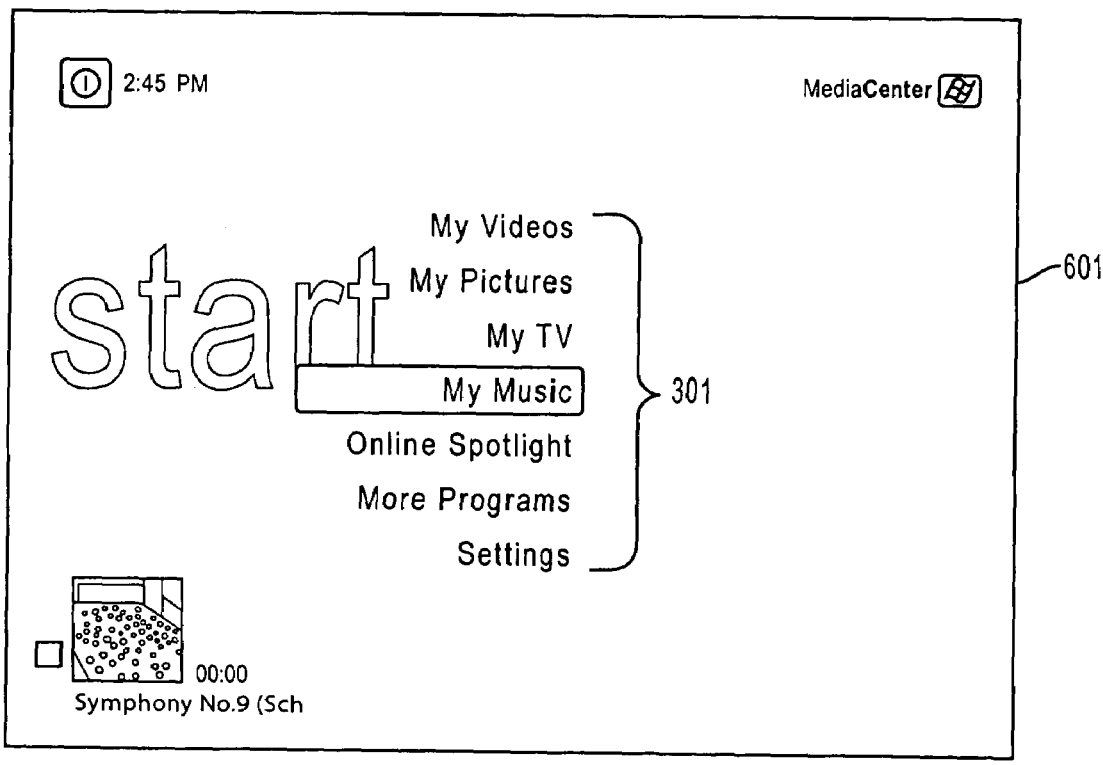
FIG. 6 illustrates a first frame in a most recently used (MRU) list reveal animation according to an illustrative embodiment of the invention.
Figure 7:
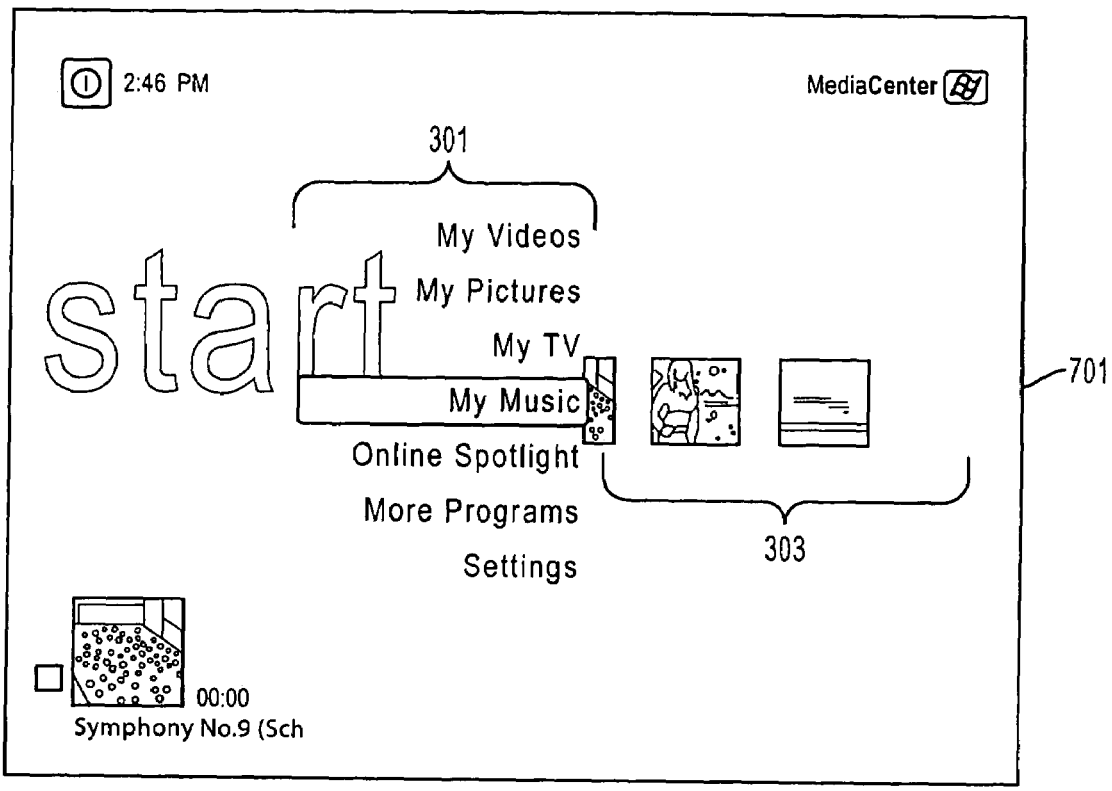
FIG. 7 illustrates an intermediate frame in a MRU list reveal animation according to an illustrative embodiment of the invention.
Figure 8:
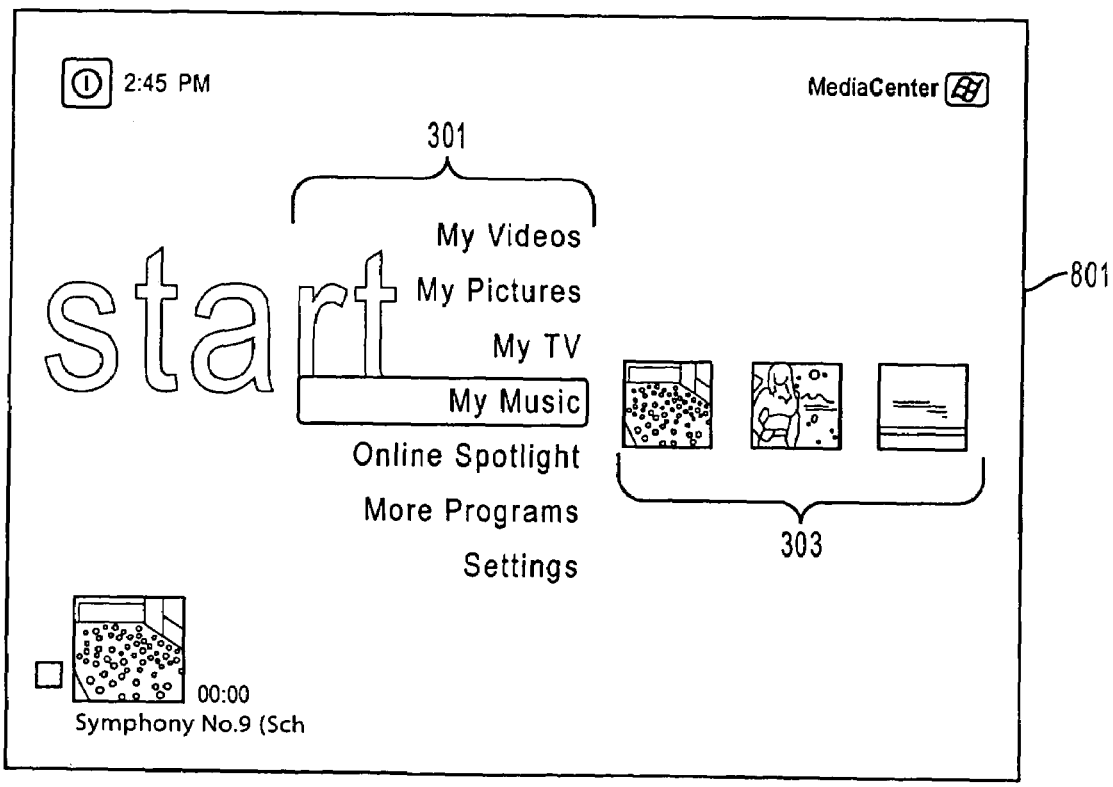
FIG. 8 illustrates a final frame in a MRU list reveal animation according to an illustrative embodiment of the invention.

According to another embodiment, with reference to FIGS. 6–8, MRU icons may animatedly slide, sweep or fly into view, graphically appearing to originate from behind the list of menu selection items 301, moving from left to right. Sliding into view provides a visual cue to the user that the change in focus of the menu item has caused a change of secondary content based on the focused menu item. FIGS. 6–8 illustrate a beginning frame 601, an intermediate frame 701, and a final frame 801, respectively, of a MRU List Reveal animation that may occur to display MRU list items associated with the newly highlighted My Music item. FIG. 6 illustrates a first frame 601 of the animation after a user, starting from the media user interface shown in FIG. 3, presses the down navigation button on remote control device 163 to select My Music. As shown in FIG. 6, the MRU list of items that was previously displayed for the previously selected My TV menu item has disappeared.

FIG. 7 illustrates an intermediate frame 701 of the animation as MRU list items 303 sweep to the right, appearing to originate from behind menu list items 301. As shown in FIG. 7, the MRU list items may have an alpha value during the animation so that the items appear at least partially transparent. Alternatively, no alpha value is used. FIG. 8 illustrates a final frame 801 of the MRU list animation, illustrative of the final position and appearance (i.e., no transparency) of MRU list items 303. Animating the appearance of the MRU list items draws the user's attention to the MRU list so that the user can clearly see that the MRU items has changed as a result of the newly highlighted menu item which is, in this example, the My Music item.

Those of skill in the art will appreciate that, while three animation frames are provided herein for the MRU list reveal animation, other animation frames exist between those provided in FIGS. 6–8. FIGS. 6–8 provide examples of Keyframes that may be used. The Keyframes provide control points between which the animation can be interpolated to transition from one Keyframe to the next. Using interpolation, the animation may be played at any frame rate and be correct (as opposed to frame-based animations). More or fewer Keyframes may alternatively be used.

According to another aspect of the invention, with further reference to FIGS. 9–12, in order to draw the user's attention to the fact that the user has navigated away from menu list 301, the media user interface may provide three-dimensional feedback to the user when the user changes the focus from menu list 301 to an item in MRU list 303. In one illustrative embodiment of the invention, the media user interface provides a graphically simulated double-hinged effect in 3-dimensional space as the user moves the navigation cursor to a MRU list item. FIGS. 9a and 9b illustrate a top perspective view and a top plan view, respectively, of media user interface start page 300 as the user is scrolling through menu items 301 with corresponding MRU list 303. In FIGS. 9a and 9b the user has not yet navigated the control cursor to a MRU list item. FIGS. 9a and 9b illustrate that all the content displayed on the start page 300 is on a single X,Y plane 901. Stated another way, all content on start page 300 has the same Z dimension. FIG. 8 illustrates start page 300 corresponding to FIGS. 9a and 9b, prior to the user selecting a MRU list item 303a, 303b, or 303c.

Figure 10A:
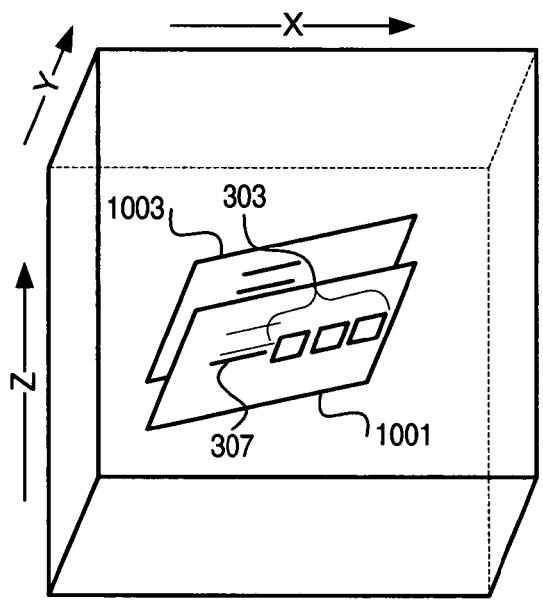
FIG. 10a illustrates a top perspective view of a double-hinged double plane menu according to an illustrative embodiment of the invention.
Figure 10B:
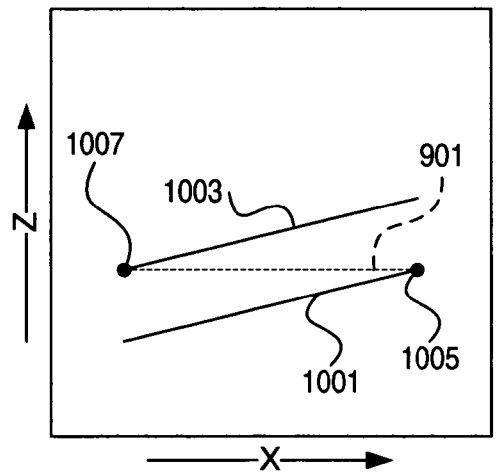
FIG. 10b illustrates a top plan view of the double-hinged double plane menu illustrated in FIG. 10a according to an illustrative embodiment of the invention.

FIGS. 10a and 10b illustrate a top perspective view and top plan view, respectively, of the media user interface in a double-hinged MRU list item selection view 1301 (see corresponding FIG. 13). FIGS. 10a and 10b illustrate that the content displayed in the MRU list item selection view is split between two planes 1001, 1003 extending from "hinge" axes 1005, 1007, respectively. Front plane 1001 may include the selected menu list item 307 and its corresponding MRU list items 303a, 303b, 303c. Back plane 1003 may include menu list items 301 other than selected menu item 307. Because each plane 1001, 1003 is optically hinged on virtual hinge axis 1005, 1007, respectively, the Z values of content on each respective plane will gradually change as the content moves away from the hinge axis on the plane. Content on back plane 1003 may be visible behind content on front plane 1001, e.g., using alpha shading of the front plane. FIG. 13 illustrates MRU list item selection view 1301 of the media user interface according to this illustrative embodiment.

By shifting selected content to front plane 1001 and unselected content to back plane 1003, the media user interface conceptually conveys to a user which menu item is selected, along with its corresponding MRU list 301, and which menu items were not selected but are available should the user choose to navigate back to them. As shown in FIG. 13, media user interface content not in menu selection list 301 or MRU list 303 may be displayed on a third plane located in the position of starting plane 901. By keeping secondary content on original plane 901, the user of the media user interface can easily navigate to content located on plane 901, such as a power menu icon 305.

Figure 11:
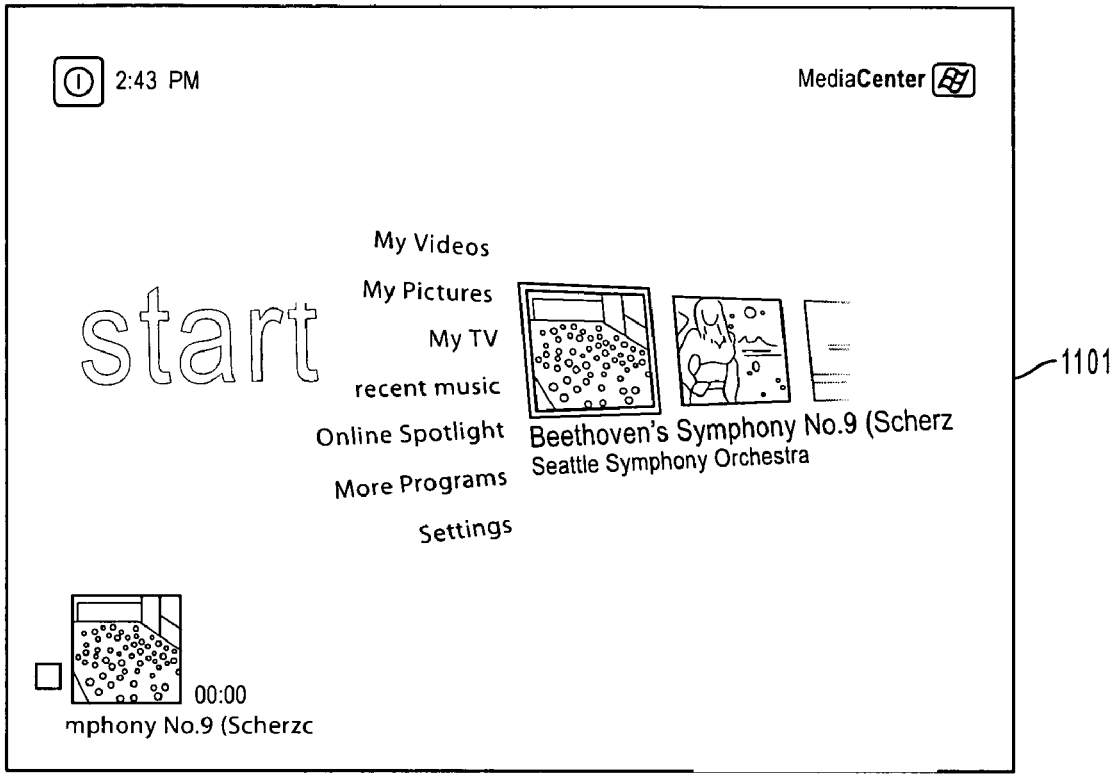
FIG. 11 illustrates a first intermediate frame of a MRU list tilt animation according to an illustrative embodiment of the invention.

FIGS. 8 and 11–13, sequentially, illustrate frames in a MRU List Tilt animation as the user moves the navigation cursor from the My Music menu item over to the first MRU list item 303a corresponding to the My Music menu item. During the animation, the two planes graphically pivot, or swing forward and back, as applicable, from the hinge axes, and MRU list items sweep outward, appearing to originate from the selected menu item 307. FIG. 8 illustrates the single plane start menu while navigation cursor 309 is over the My Music menu item. FIG. 11 illustrates a first intermediate frame 1101 as the media user interface splits the content between two planes and begins to virtually pivot the front plane 1001 forward in the Z-dimension on hinge axis 1005, and begins to pivot the back plane 1003 backward in the Z-dimension on hinge axis 1007. FIG. 11 also illustrates the MRU list items 301 beginning to sweep outward, appearing to originate from behind the selected menu list item 307.

Figure 12:
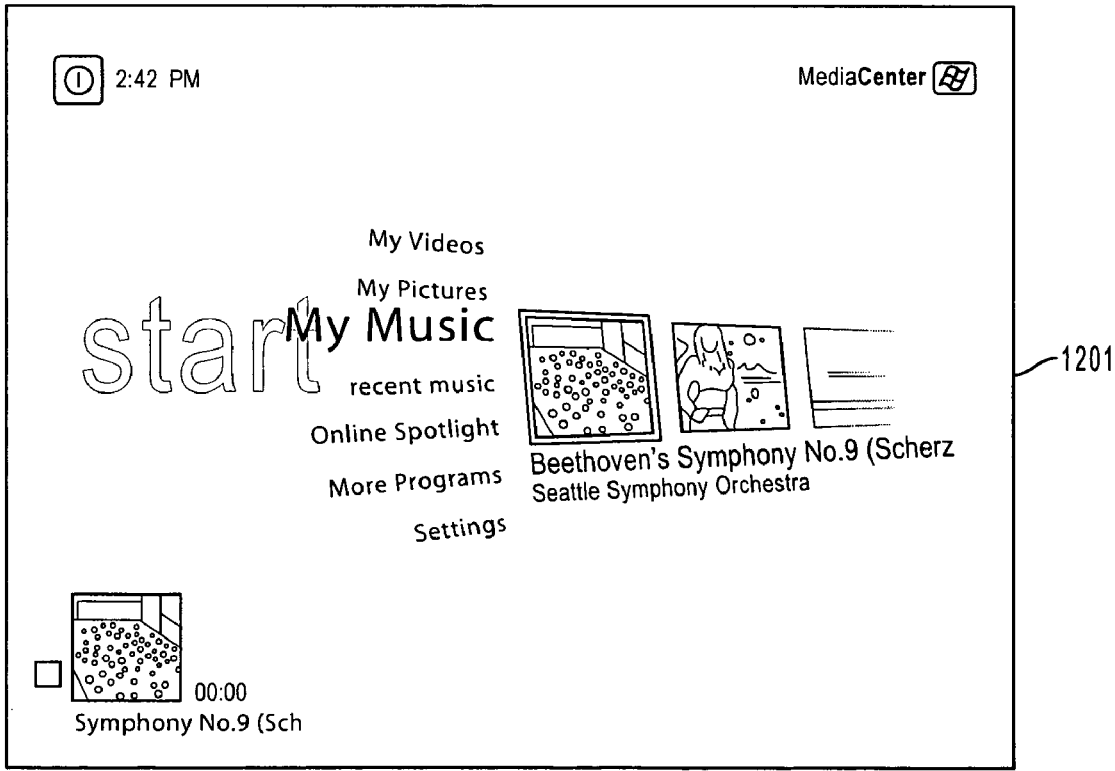
FIG. 12 illustrates a second intermediate frame of a MRU list tilt animation according to an illustrative embodiment of the invention.

FIG. 12 illustrates a second intermediate frame 1201 in the animation, illustrating the planes nearing their respective final positions. In FIG. 12, the selected menu item "My Music" continues to graphically move forward and is beginning to take on a more prominent appearance as compared to the receding menu items that were not selected. A sub-title, "recent music," corresponding to the selected menu item is beginning to appear more clearly than in the frame 1101 illustrated in FIG. 11. Also in FIG. 12 the MRU list items continue to sweep outward, nearing their final positions. FIG. 13 illustrates a final frame 1301 of the animation, with menu items and MRU list items in their final positions, selectable by a user as desired. The above illustration is provided as an example use of dual hinged planes to provide clear visual and conceptual feedback to a user of a 10-Foot user interface. The dual hinged planes may be used for any navigational feature of the media user interface, and should not be construed as limited to selection of a MRU list item.

With further reference to FIGS. 9 and 14–22, according to another aspect of the invention, the media user interface may split content onto two planes, a more prominent front plane and less prominent back plane, but instead of hinging each plane as shown in FIGS. 9–13, the media user interface graphically pushes the back plane straight back from its original position, and pulls the front plane straight forward from its original position. The resulting graphical effect is a double-wall of content, where selected or accentuated content is brought forward and highlighted, and unselected content is pushed backward in three-dimensional space, providing a clear conceptual and visual picture to the user of selected and unselected content, or of a new menu taking prominence over a previously showing menu.

Figure 9A:
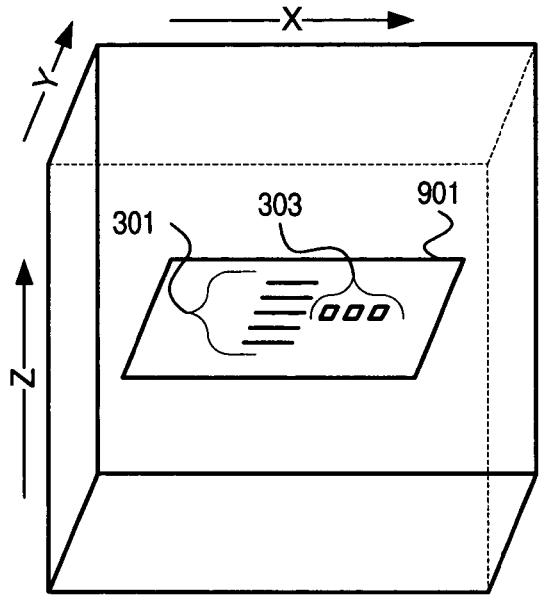
FIG. 9a illustrates a top perspective view of a single plane menu according to an illustrative embodiment of the invention.
Figure 9B:
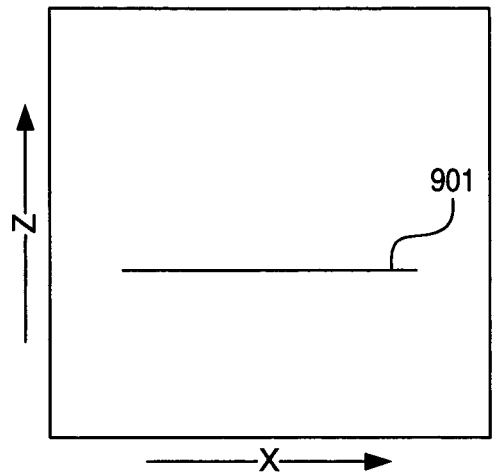
FIG. 9b illustrates a top plan view of the single plane menu illustrated in FIG. 9a according to an illustrative embodiment of the invention.

FIG. 9a illustrates a virtual top perspective view, and FIG. 9b illustrates a top plan view, of media user interface start page 300 as the user is scrolling through menu items 301 with corresponding MRU list 303. In FIGS. 9a and 9b the user has not yet selected a new menu item to initiate the plane split. FIGS. 9a and 9b illustrate that all the content displayed on the start page 300 is on the same plane 901. Stated another way, all content on start page 300 has the same Z dimension. FIG. 8 illustrates start page 300 corresponding to FIGS. 9a and 9b, prior to the user highlighting or selecting a menu list item or other menu item.

Figure 14A:
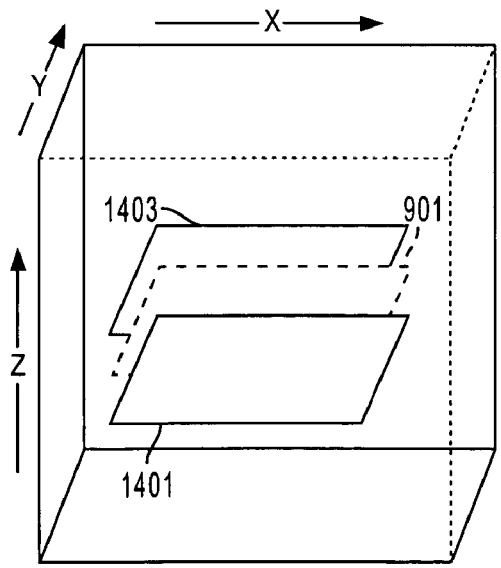
FIG. 14a illustrates a top perspective view of a double-wall double plane menu according to an illustrative embodiment of the invention.
Figure 14B:
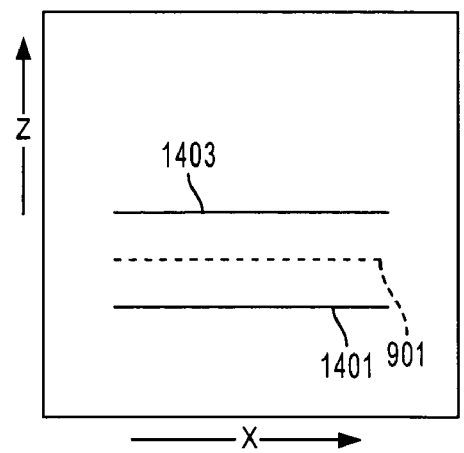
FIG. 14b illustrates a top plan view of the double-wall double plane menu illustrated in FIG. 14a according to an illustrative embodiment of the invention.

FIGS. 14a and 14b illustrate a top perspective view and top plan view, respectively, of the media user interface after splitting content between two planes, a front plane 1401 and back plane 1403, where front plane 1401 is graphically pulled straight forward and back plane 1403 is graphically pushed straight backward. All content on front plane 1401 has substantially the same Z-value, and all content on back plane 1403 has substantially the same Z-value, although different from the Z-value of content on the front plane 1401. Front plane 1401 may include a new menu (e.g., a submenu) corresponding to a content item selected by the user from previous plane 901. Back plane 1403 may include the previous menu on which the user selected the content item to cause the new menu to appear. It will be appreciated that the amount that the front plane is pulled forward in Z-space and the amount the back plane is pushed back in Z-space is a secondary consideration to the fact that the simulated planes are moved substantially straight forward and back, respectively, relative to each other. Alternatively, the back plane 1403 might move backward, and front plane 1401 might remain stationary and open new content, e.g., a power menu, in its stationary position (where starting plane 901 was originally located). In still another alternative, the back plane 1403 might remain stationary while front plane 1401 moves forward and displays new content as it moves forward, e.g., a context menu. The graphically simulated appearance of moving plane 1401 forward, moving plane 1403 backward, or both, may be accomplished by enlarging content on plane 1401 and/or reducing content on plane 1403, providing content on plane 1401 in focus while content on plane 1403 is unfocused to some extent, and/or by making content on plane 1401 lighter or brighter and making content on plane 1403 darker in appearance.

Figure 18:
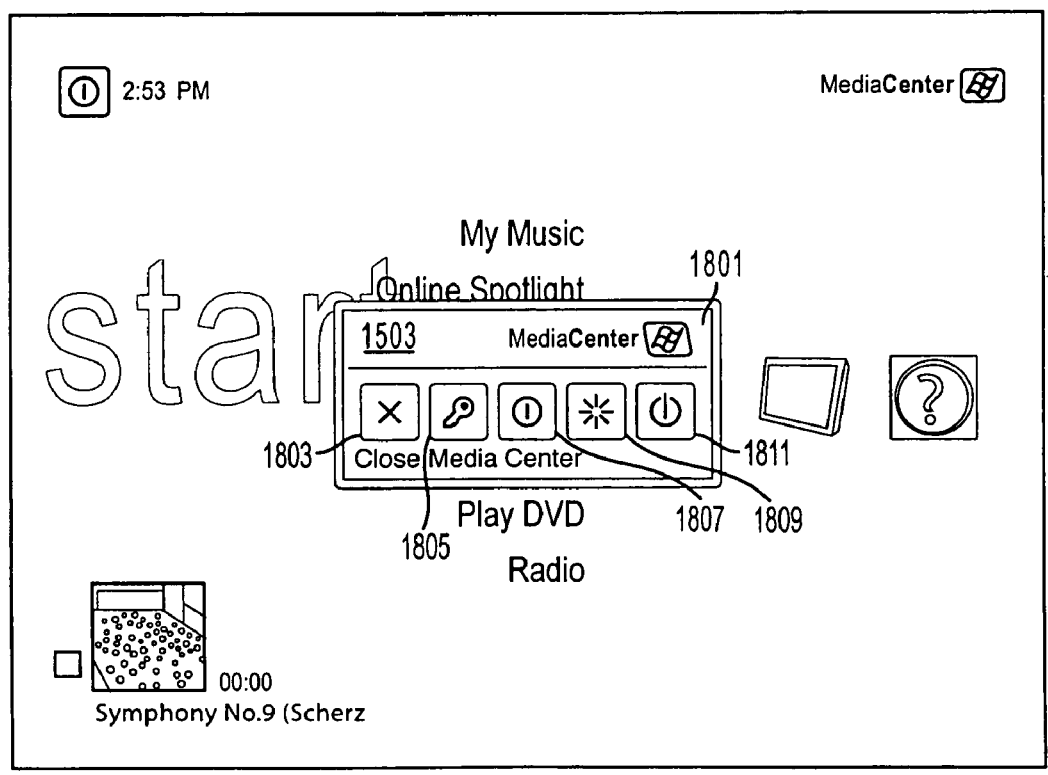
FIG. 18 illustrates a final frame of a power menu reveal animation according to an illustrative embodiment of the invention.

With further reference to FIG. 18, the double-wall effect may be used to illustrate to the user that the user has selected a power menu. FIG. 18 illustrates a media user interface with power menu 1801 on front plane 1401, and start menu content 301 on back plane 1403. As is evident by a comparison of FIG. 18 to FIG. 3, the start menu content in FIG. 18 behind the power menu 1801 is graphically simulated to appear smaller than the start menu content 301 in FIG. 3 because the start menu content in FIG. 18 is on a plane that has been pushed backward behind the power menu 1801 in FIG. 18. Power menu 1801 may be considered a secondary menu because the user may quickly return from the power menu 1801 to the start menu 300, e.g., if the user decides not to close the UI application 205 from the power menu 1801 or perform any other option available on the power menu. In this example, the power menu has buttons 1803–1811 to close the media center application 205, logoff the current user, shut down the computer, restart the computer, and go to Stand-By power mode, respectively, each button being selectable using navigation and select buttons on remote control device 163.

Use of the double-wall 3-dimensional graphical effect may be advantageous to convey to a user that the user has select a secondary menu, such as a context menu or a power menu, from which the user might quickly return to the original menu from which the user selected the sub-menu. However, the double-wall effect can also be used for other purposes in a 10-Foot user interface to conceptually indicate to the user, by pushing content backward, that current navigation has been temporarily interrupted, and new content in front of the interrupted content now has the focus.

Figure 15:
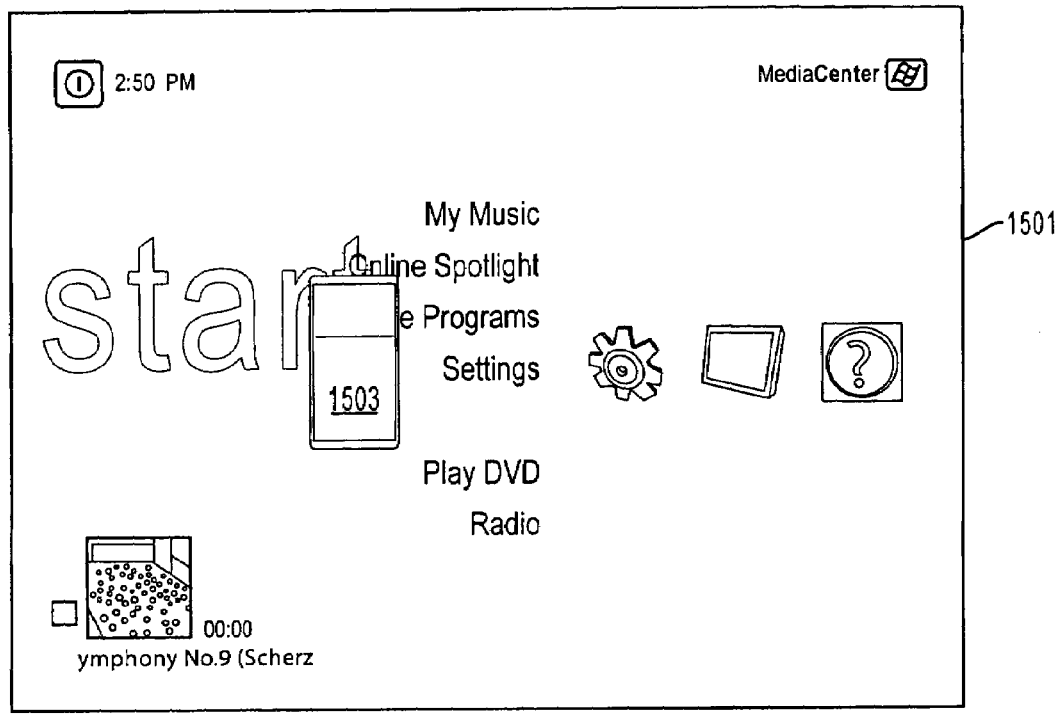
FIG. 15 illustrates a first intermediate frame of a power menu reveal animation according to an illustrative embodiment of the invention.

FIGS. 15–18 illustrate a power menu reveal animation that may visually indicate to the user that the user has selected the power button 305 (FIG. 3) on start menu 300. FIG. 15 illustrates a first intermediate frame 1501 of the animation after the user selects power button 305. In frame 1501, starting plane 901, now considered back plane 1403, has already been pushed backward in the Z-dimension, thus making all content originally located on plane 901 (i.e., all start menu content) graphically appear smaller as it appears to move away from the user. Also in frame 1501, window 1503 has begun to appear. Power menu 1801 will be placed in window 1503 when window 1503 becomes fully formed.

Figure 16:
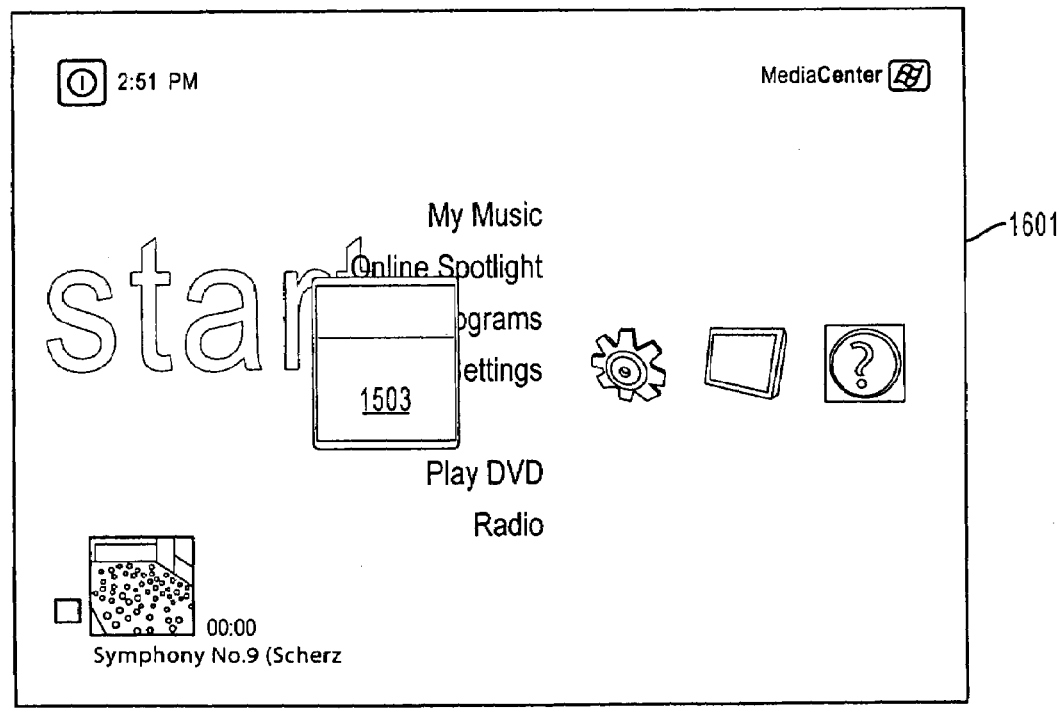
FIG. 16 illustrates a second intermediate frame of a power menu reveal animation according to an illustrative embodiment of the invention.
Figure 17:
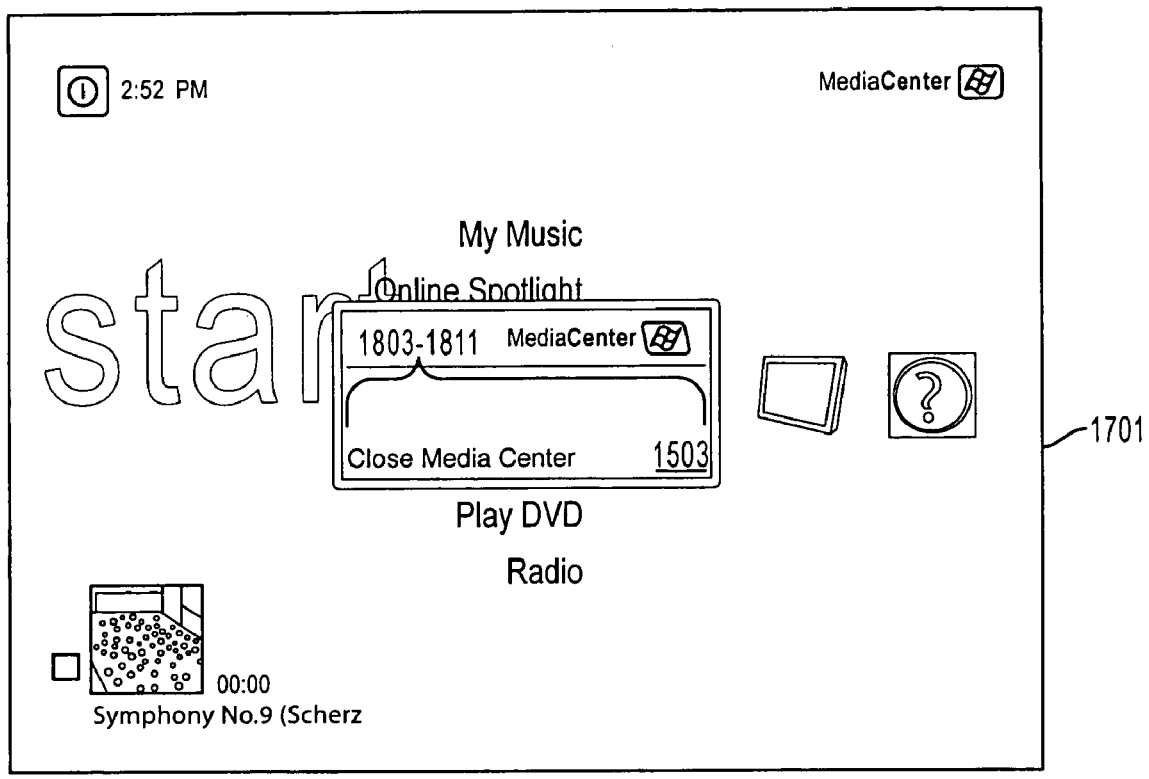
FIG. 17 illustrates a third intermediate frame of a power menu reveal animation according to an illustrative embodiment of the invention.

FIG. 16 illustrates a second intermediate frame 1601 of the power menu reveal animation. In FIG. 16, the content on back plane 1403 has not moved, as the back plane quickly reaches its destination in Z-space in this particular example (however, the speed of the animation and the speed with which any particular plane moves may be set as desired). Also in frame 1601, window 1503 continues to open, and is now approximately half its final size. FIG. 17 illustrates a third intermediate frame 1701 of the power menu reveal animation. In frame 1701 the power menu window 1503 has almost reached its final size, and buttons 1803–1811 have begun to fade into view. FIG. 18 illustrates the final frame of the power menu reveal animation, where window 1503 is fully formed and power menu 1801 completed, including buttons 1803–1811.

Figure 21:
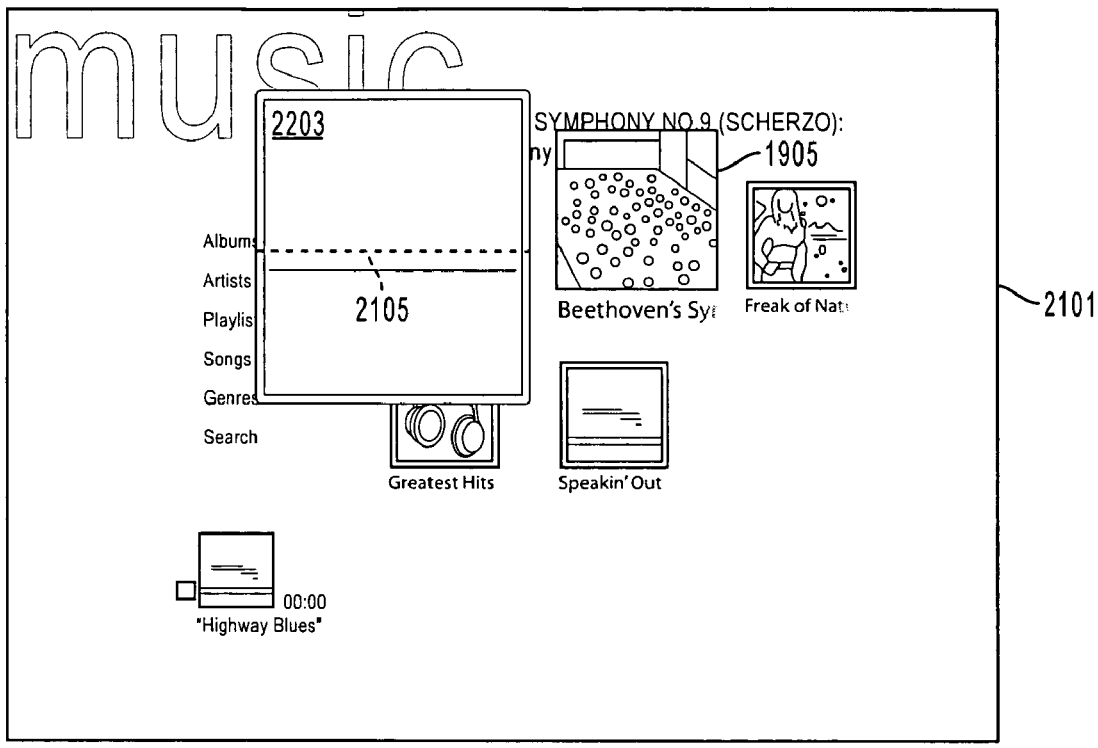
FIG. 21 illustrates a second intermediate frame of a context menu reveal animation according to an illustrative embodiment of the invention.
Figure 22:
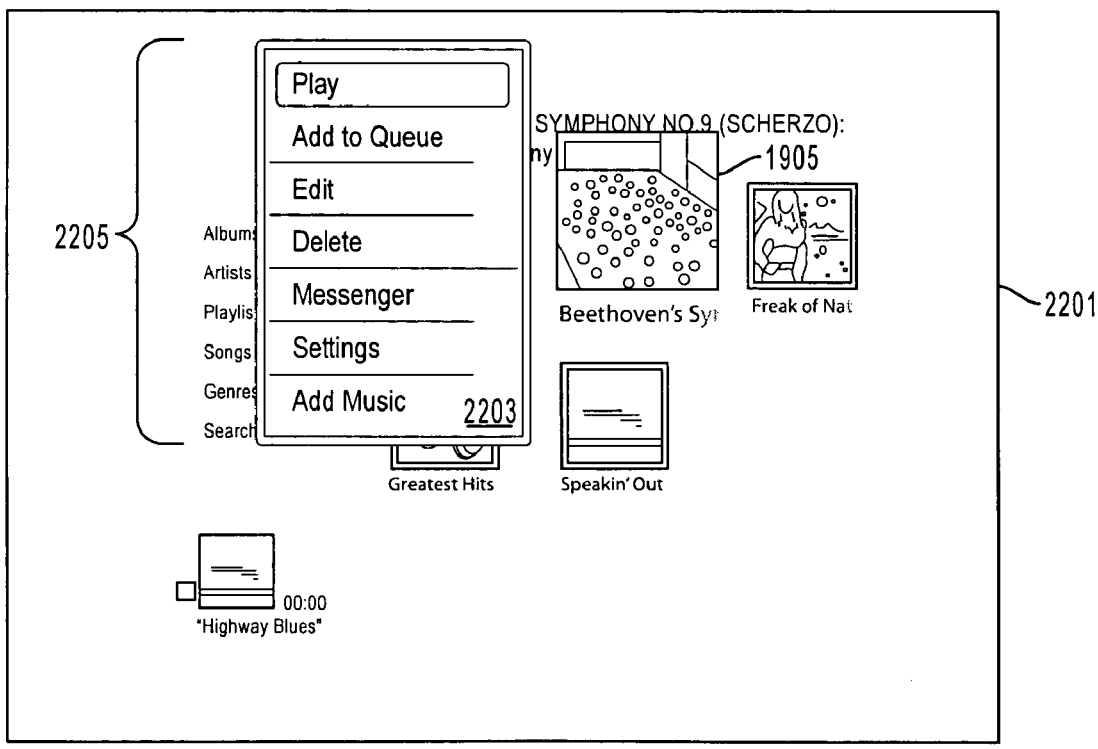
FIG. 22 illustrates a final frame of a context menu reveal animation according to an illustrative embodiment of the invention.
Figure 23:
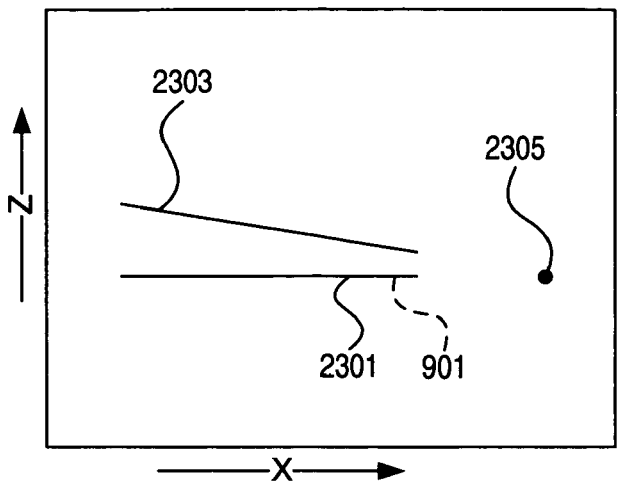
FIG. 23 illustrates a top plan view of a double plane single-hinge menu according to an illustrative embodiment of the invention.

With further reference to FIGS. 19–23, a variation of the double-wall effect may be used to bring up a context menu in the media user interface. Illustrated by the top plan view of FIG. 23, FIGS. 19–22 illustrate a context menu reveal animation that may be used to provide a context menu to a user of the media user interface. FIG. 23 illustrates the resulting conceptual top plan view of the two planes at the end of the animation, which begins from the conceptual top plan view shown in FIG. 9*b*. FIG. 23 illustrates a single-hinge axis 2305 around which plane 2303 swings backward from the original position of plane 901.

Figure 19:
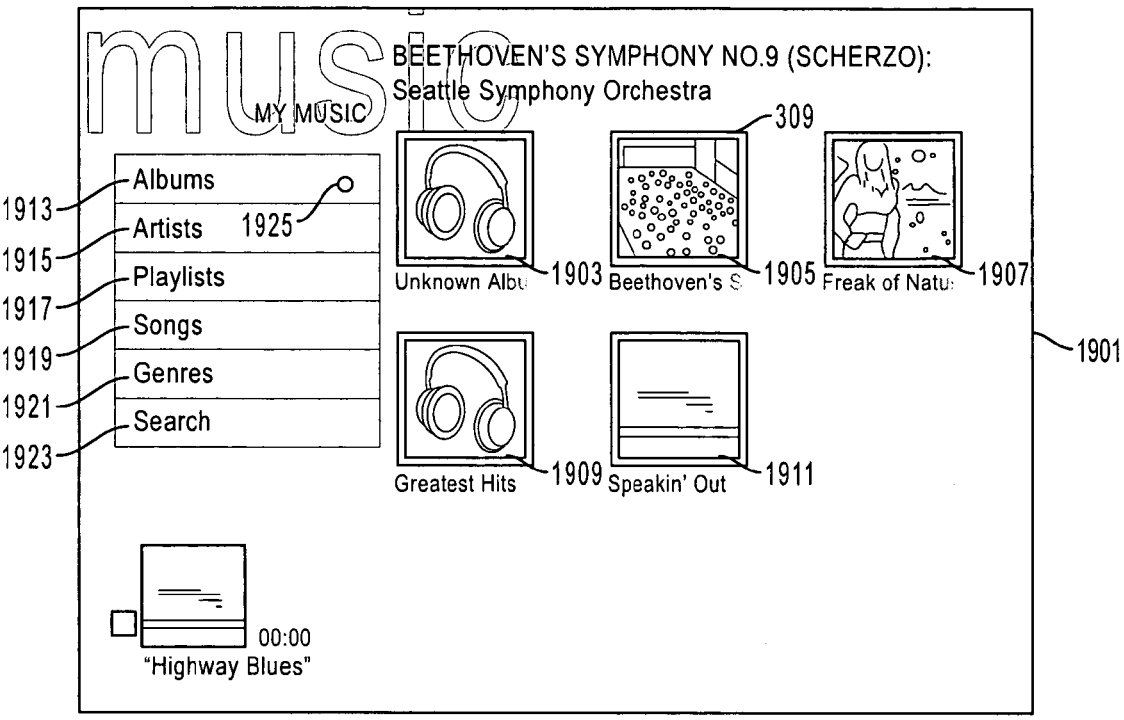
FIG. 19 illustrates a My Music menu according to an illustrative embodiment of the invention.

FIG. 19 illustrates a My Music menu, which results from the user selecting the highlighted My Music menu item from FIG. 8. The My Music menu 1901 includes icons 1903–1911 representative of music stored on the computer 110 on which the media user interface is executing, or on some other networked computer to which computer 110 has access. In the example shown in FIG. 19, because the My Music menu is presently in Album view, as indicated by view indicator 1925, the icons are representative of musical albums. My Music Menu 1901 also has a plurality of menu buttons 1913–1923, through which a user can view music by album, artist, play list, song, or genre, as well as search for music, respectively. View indicator 1925 is placed next to whichever menu button represents the current My Music menu view.

In FIG. 19 the user selection cursor 309 indicates that the icon 1905 is presently highlighted for selection by the user. "Right-clicking" on the icon 1905 initiates the animation sequence shown in FIGS. 20–22. Because the user might be using a remote control device 163 to control the media user interface instead of a mouse, the remote control device may have a secondary selection button, similar to right-clicking a right-handed configured computer mouse, the selection of which brings up a context menu instead of playing the selected music as might result from using the primary selection button on remote control device 163.

Figure 20:
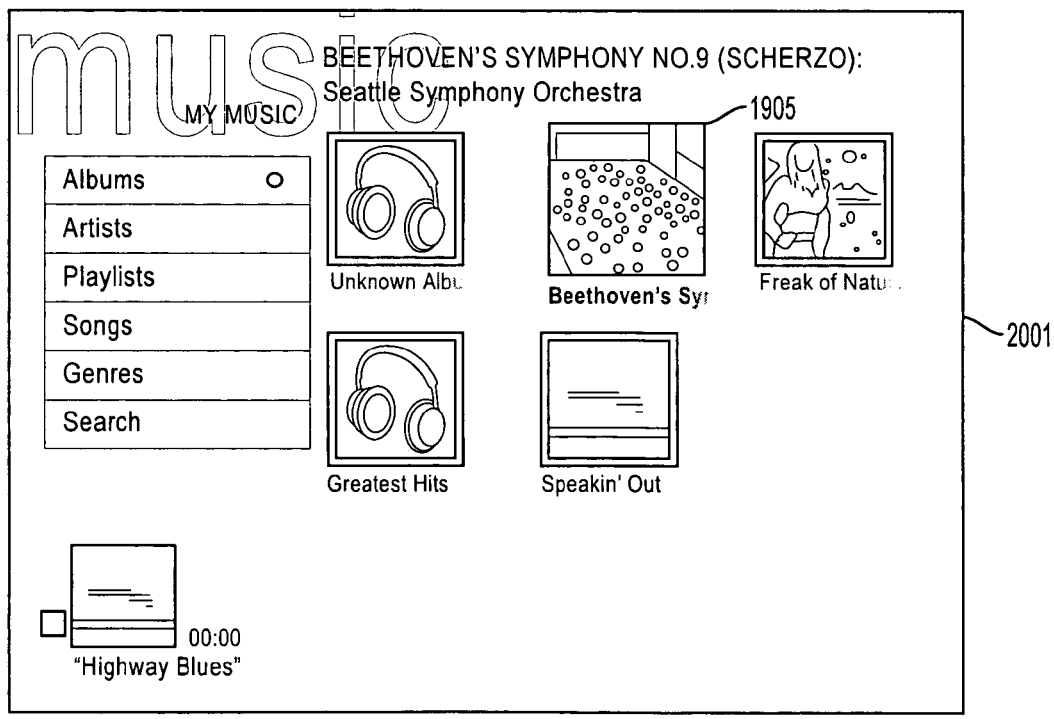
FIG. 20 illustrates a first intermediate frame of a context menu reveal animation according to an illustrative embodiment of the invention.

FIG. 20 illustrates a first intermediate frame 2001 shortly after the user right clicks icon 1905. In FIG. 20, icon 1905 has been slightly enlarged to convey to the user that the user selected icon 1905 (as opposed to any of the other icons), and icon 1905 is also placed on plane 2301 (FIG. 23). The remaining content, originating from plane 901, is placed on plane 2303, and has been rendered to appear that it has begun to move backwards. In this example, plane 2303 is hinged at point 2305, such that the content on plane 2303 appears to swing back instead of straight back.

FIG. 21 illustrates a second intermediate frame 2101 of the context menu reveal animation. In frame 2101, window 2203 has begun to form, appearing to originate from a vertical center position 2105 of final window 2205, and gradually enlarging the window 2203 in upward and downward directions. Content on plane 2303 continues to swing backward on hinge axis 2305. FIG. 22 illustrates a final frame 2201 of the context menu reveal animation sequence. In frame 2201, window 2203 is fully formed and context menu 2205 is displayed for navigation and selection by the user. Window 2203 (including its contents) and icon 1905 are on plane 2301, whereas the remaining content is fully swung back on plane 2301.

The single-hinge animation effect illustrated in FIG. 19–23 may be modified in various ways. For example, the hinge axis may be placed to the left of the corresponding hinged plane instead of to the right of the corresponding hinged plane as shown in FIG. 23, or the, hinge axis may be placed above or below the corresponding hinged plane. Those of skill in the art will appreciate that, by using a 3D enabled application such as DirectX®, the hinge axis may be placed anywhere in 3D space. According to an aspect of the invention, the hinge axis may be placed conceptually distant from the selected icon. That is, if the user selects an icon on the left hand side of the My Music menu 1901, the UI application may place hinge axis 2305 to the right of the My Music menu, such as is shown in FIG. 23, so that content on the back plane 2303 appears farther behind the selected icon than it would if the hinge axis were placed to the left of the menu. Similarly, if the user selects an icon on the right hand side of the My Music menu 1901, the UI application may place hinge axis 2305 to the left of the My Music menu; if the user selects an icon on the top of the My Music menu 1901, the UI application may place hinge axis 2305 below the My Music menu; if the user selects an icon on the bottom of the My Music menu 1901, the UI application may place hinge axis 2305 above the My Music menu. Similar hinge placements may be used in any direction, including diagonal, to swing unused content as far as possible behind the selected content. According to an aspect of the invention, a user may specify where the hinge axis is located, e.g., by changing a hinge axis location setting under the Settings menu items.

Other multi-planar effects and animations may be used to conceptually convey navigation and selection of menus and items to a user of the media user interface. The specific multi-planar effect or animation used is secondary to splitting the menu content onto two or more planes to conceptually convey to a user which item or items are relevant based on the user's navigation and selection of menus and items on the media user interface. In some effects and animations two planes may be used, such as are illustrated in FIGS. 10b (excluding plane 901), 14b (excluding plane 901), 23, or 30 (including planes 3301, 3303 and excluding plane 901). In other effects and animations, the UI Application 205 may split content onto three or more planes, such as are illustrated in FIGS. 10b (including plane 901), 14b (including plane 901), 29 (including planes 2901, 2903, 2905), and 30 (including planes 3001, 3003, 901). More relevant content or content relating to the user's most recent selection is preferably places on the more prominent plane, typically the plane in the foreground as compared to the other plane(s) currently in use.

Using a 3D-enabled development application such as DirectX® enables other novel features of the media user interface described herein. For example, the background of the media user interface may remain somewhat constant from one menu to the next while slightly changing to indicate to the user that the application 205 has not frozen, and also to prevent burn-in in the display device 191. Thus, the media user interface may have an animated background, as illustrated in FIGS. 3–8, 11–13, and 15–22. In FIGS. 3–8, 11–13, and 15–22 the background appears similar in each figure. However, on close inspection one will notice that the backgrounds are actually slightly different, while retaining overall similarities so as not to confuse the user. The animated background illustrated in FIGS. 3–8, 11–13, and 15–22 may be created using two or more rotating layers in 3D space, the front layer preferable being almost transparent, each layer having an alpha value and a rotational cycle length. Preferably each cycle length is different, and the cycle lengths are not multiples of each other. The two layers may be connected as if by an invisible pole, and are spaced apart in Z space (along the axis of the "invisible pole"). When the parent plane (the background) rotates, the child plane (the foreground) may rotate as well, at a same or different speed. The animated effect is thus achieved by rotating the parent plane and having the depth between the two create a sense of motion to the user.

Figure 24:
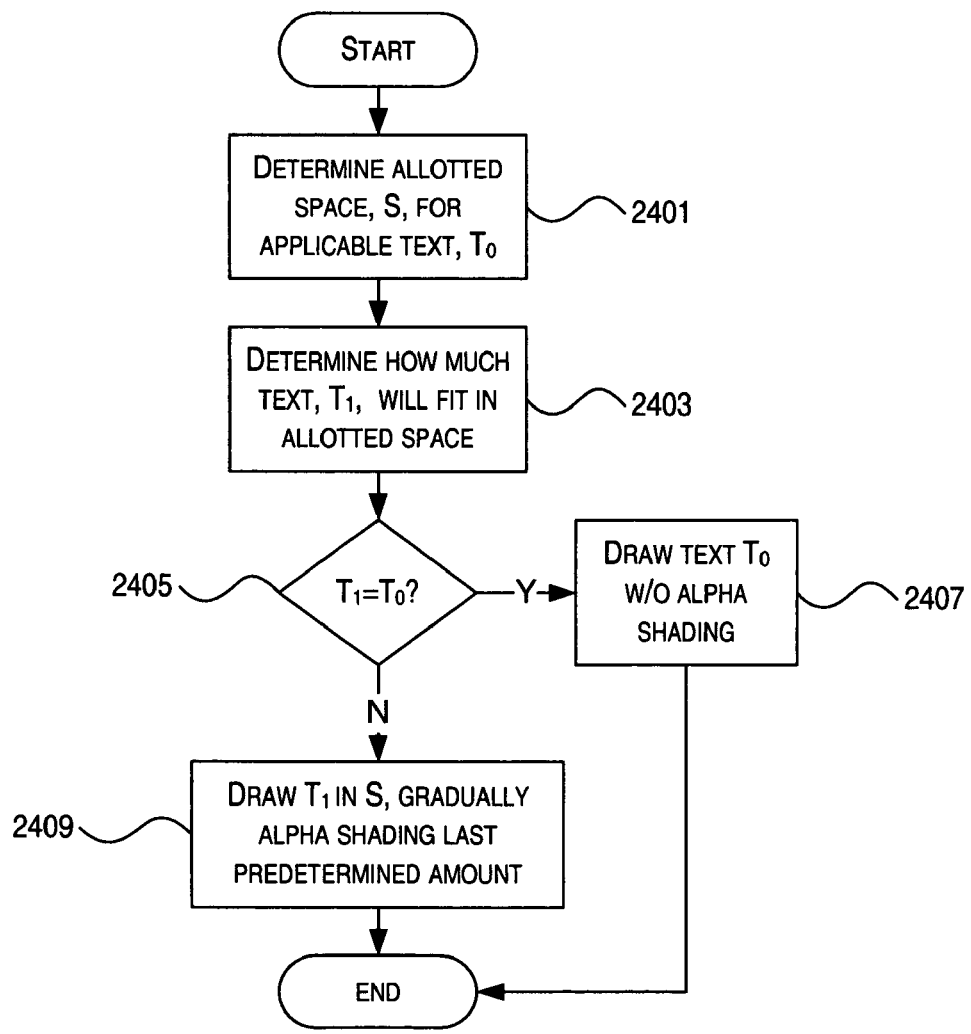
FIG. 24 illustrates a flowchart for a method of performing alpha fading according to an illustrative embodiment of the invention.

Another feature enabled by the use of 3D space and alpha shading is alpha-fading as illustrated in FIGS. 13, 19, and 22. That is, conventionally when a display does not have enough allotted space to display the entire name of an item, or enough room to display all the text associated with an item, the application will either abruptly cut off the text, or display ellipses (" . . . ") to indicate to the user that more text is available than is displayed. The media user interface, however, may use the alpha ($\alpha$) video channel of the text to gradually fade-out the text. With reference to FIG. 24, in step 2401 UI application 205 determines how much space, S, is available for text $T_0$ to be written to the screen. In step 2403 UI application 205 determines how much of text $T_0$ will fit in the allotted space S. The amount of text that will fit in allotted space S is referred to as $T_1$. The text measurement may be acquired from Win32 GDI APIs, such as DrawText. In step 2405 UI application 205 determines whether $T_1$ and $T_0$ are equal, meaning that all of text $T_0$ will fit in space S. If $T_1$ and $T_0$ are equal, then UI application 205 proceeds to draw text T0 in step 2407 in the allotted space without alpha blending. If $T_1$ and $T_0$ are not equal, then UI application 205 draws text $T_1$ in the allotted space, and alpha blends a last predetermined amount of text $T_1$, for example the last 1–5 characters, gradually changing the alpha level from fully opaque to fully transparent. The alpha gradation may use Direct3D's vertex color interpolation capabilities. The need for ellipses is thus avoided through the use of alpha blending, referred to herein as alpha fading.

Figure 25:
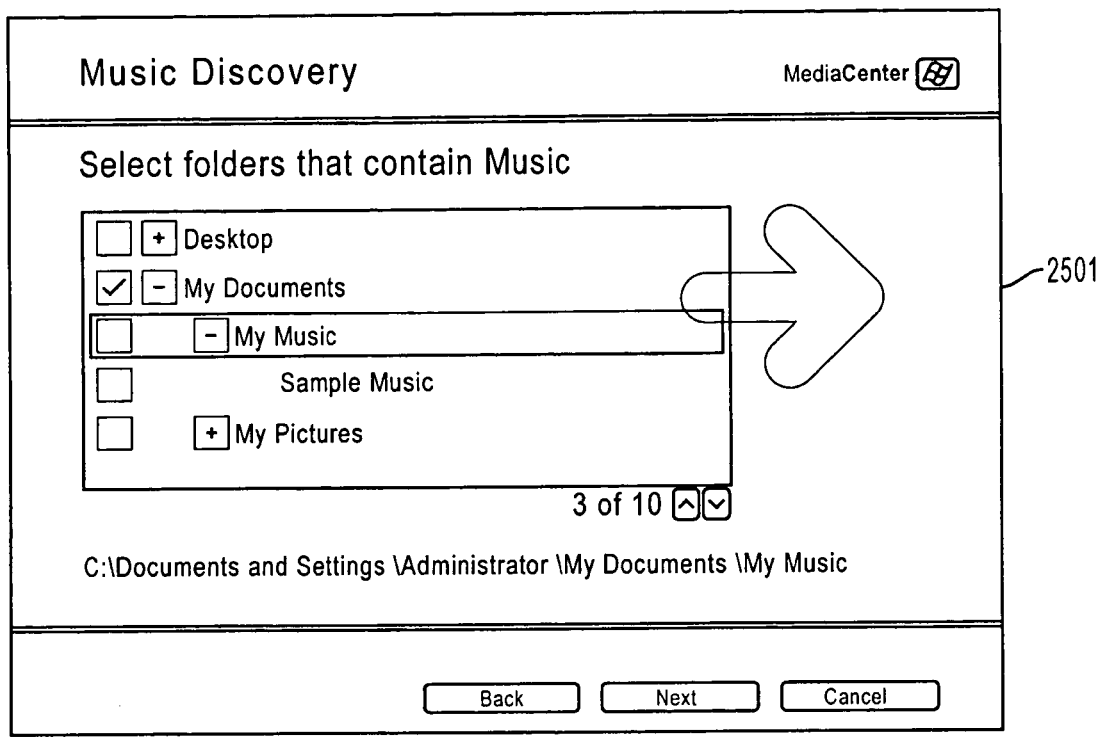
FIG. 25 illustrates a folder navigation menu according to an illustrative embodiment of the invention.

In yet another feature of the media user interface, UI application 205 may provide additional features for media user interface in addition to those described above. For example, FIG. 25 illustrates a folder navigation screen 2501. In FIG. 25, the folder navigation screen 2501 is being used to select folders to search for music to add to a music library. However, the folder navigation illustrated in FIG. 25 may be used for any purpose for which folder navigation is useful.

Figure 26:
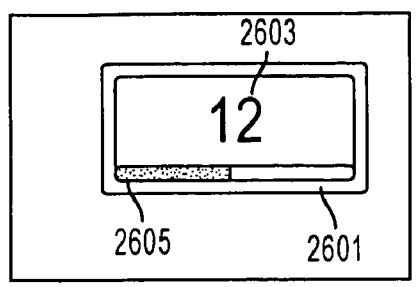
FIG. 26 illustrates a volume window according to an illustrative embodiment of the invention.
Figure 27:
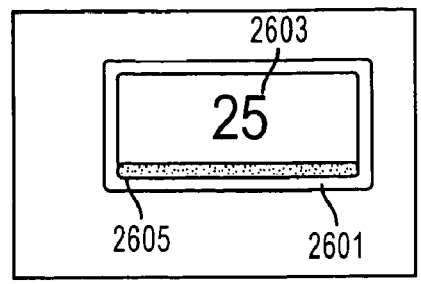
FIG. 27 illustrates a second view of the volume window according to an illustrative embodiment of the invention.
Figure 28:
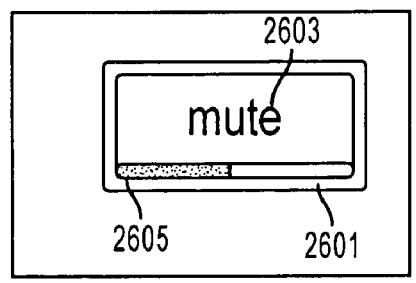
FIG. 28 illustrates a view of the volume window when the volume is muted according to an illustrative embodiment of the invention.
Figure 29:
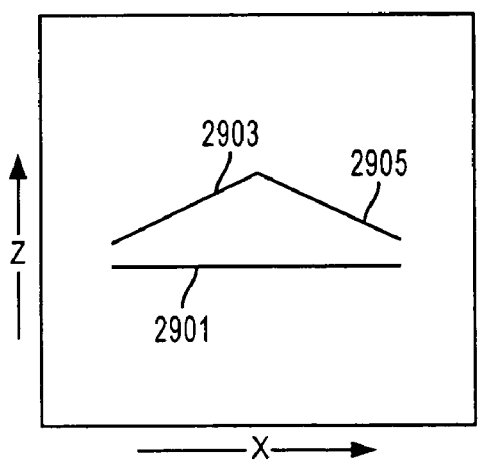
FIG. 29 illustrates a top plan view of an alternative multi-plane media user interface according to an illustrative embodiment of the invention.
Figure 30:
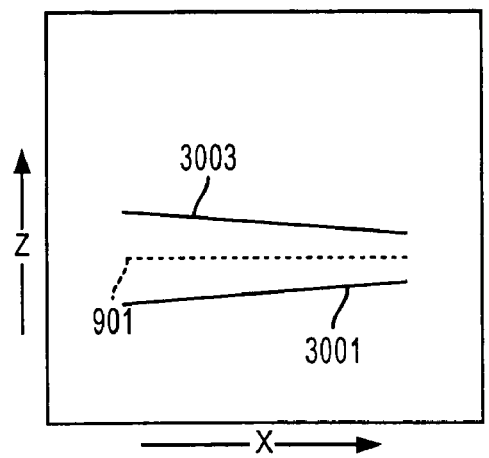
FIG. 30 illustrates a top plan view of an alternative multi-plane media user interface according to an illustrative embodiment of the invention.

FIGS. 26–28 illustrate a volume window 2601 that appears when the user adjusts the sound volume, e.g., using remote control device 163. Volume window 2601 includes a numerical indicator 2603 of the volume level, as well as a visual indicator 2605 of the volume level in the form of a volume bar that fills from left to right as the volume moves from the minimum volume level to the maximum volume level. The volume window 2601 is beneficial because the user can easily determine, upon turning mute off, what volume level the volume will return to. That is, as shown in FIG. 31, the numerical indicator may switch to "mute" when the mute is on, while volume bar 2605 indicates the volume that will result when mute is turned off. The volume window 2601 may appear on the single plane 901 (FIG. 9), or may appear using any of the double plane effects described above.

The media user interface described above, while rendered on a flat or slightly convex display device, such as a monitor or TV, is graphically simulated to appear three-dimensional. Using the features described herein, the UI Application 205 provides a media user interface that is suitable for use as a 10-Foot user interface by placing prominent icons and menu items on the display, using three-dimensional transformations to increase the display real estate on which content can be displayed, and using animation to conceptually convey navigation between views to the user. The media user interface is also especially useful when used with a media mode of operation of a data processing device, although a media mode is not required. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for displaying content a user through a user interface, comprising steps of:
    displaying on a display device connected to a data processing device on which the user interface is rendered a first plurality of selectable menu items in a single simulated plane in a three-dimensional graphical space, said first plurality of menu items selectable by the user using a remote control device;
    responsive to the user selecting one of the first plurality of selectable menu items, displaying the selected one menu item on a simulated first plane in the three-dimensional graphical space, and displaying the first plurality of selectable menu items other than the one selected item on a simulated second plane in the three-dimensional graphical space, wherein the first plane has a more prominent display position than the second plane;

pivoting the first plane on a first hinge axis; and pivoting the second plane on a second hinge axis.

2. The method of claim 1, wherein the first plane having a more prominent display position than the second plane comprises the first plane being in front of the second plane in the three dimensional graphical space as viewed by a user of the user interface.

3. The method of claim 1, further comprising displaying on the first plane a second plurality of menu items corresponding to the selected one item.

4. The method of claim 3, wherein the second plurality of menu items comprise items of a context menu corresponding to the selected one item.

5. The method of claim 3, wherein the selected one item comprises a type of media, and the second plurality of menu items comprise a list of most recently used media of the selected one type of media.

6. The method of claim 3, wherein the second plurality of menu items comprises a sub-menu underneath the selected one menu item.

7. The method of claim 1, wherein the first hinge axis has a different location in the three-dimensional space than the second hinge axis.

8. The method of claim 1, wherein the first and second hinge axes are on substantially opposite sides of the display device in an X-dimension of the three dimensional space.

9. The method of claim 1, further comprising simulating pushing the second plane back in a Z-dimension of the three-dimensional space as compared to the first plane.

10. The method of claim 9, further comprising pulling the first plane forward in the Z-dimension.

11. A computer readable medium storing computer executable instructions for performing the method of claim 1.

12. A data processing system, comprising:

a remote control device for controlling the data processing system;

a data processor configured to provide a three-dimensional user interface on a display device connected to the data processing system by executing computer executable software modules stored in a memory of the data processing system; and the memory storing computer executable software modules, comprising:

a user interface software module configured to provide the user interface in a three-dimensional space displayed on the display device, said user interface including a plurality of menus navigable by a user using the remote control device; and an animation module which, under control of the user interface software module, provides a sequence of frames of an animation when the user selects one of a plurality of menu items from a first menu of the plurality of menus, wherein the animation sequence splits the plurality of menu items between a first plane and a second plane and animates the first and second planes moving away from each other in the three-dimensional space, wherein the animation module pivots the first plane on a first hinge axis, and wherein the animation module pivots the second plane on a second hinge axis.

13. The data processing device of claim 12, wherein the selected one menu item is on the first plane and the plurality of menu items other than the selected one menu item are on the second plane.

14. The data processing device of claim 12, wherein the first plane has a more prominent display position than the second plane.

15. The data processing device of claim 14, wherein the first plane having a more prominent display position than the second plane comprises placing the first plane in front of the second plane in the three dimensional graphical space as viewed by a user of the user interface.

16. The data processing device of claim 12, wherein the first and second hinge axes are on substantially opposite sides of the display device in an X-dimension of the three dimensional space.

17. The data processing device of claim 12, wherein the first hinge axis has a different location in the three-dimensional space than the second hinge axis.

18. The data processing device of claim 12, wherein the animation module pushes the second plane back in a Z-dimension of the three-dimensional space as compared to the first plane.

19. The data processing device of claim 12, wherein the animation module pulls the first plane forward in the a Z-dimension.

20. The data processing device of claim 12, wherein the user interface software module causes a second plurality of menu items corresponding to the selected one item to be displayed on the first plane.

21. The data processing device of claim 20, wherein the second plurality of menu items comprise items of a context menu corresponding to the selected one item.

22. The data processing device of claim 20, wherein the selected one item comprises a type of media, and the second plurality of menu items comprise a list of most recently used media of the selected one type of media.

23. The data processing device of claim 22, wherein the animation module makes the second plurality of menu items appear to slide into view from behind the selected one menu item.

24. The data processing device of claim 20, wherein the second plurality of menu items comprises a sub-menu underneath the selected one menu item.

25. A computer readable medium storing computer executable instructions for a method of providing a three-dimensional user interface, comprising steps of:

generating a three-dimensional graphical space for providing the user interface of a data processing device;

graphically displaying on a display device connected to the data processing device a first list of a plurality of menu items on a single simulated plane in the three-dimensional graphical space, said plurality of menu items selectable by a user navigating the user interface using a remote control device;

responsive to the user selecting one of the plurality of menu items, displaying the selected one menu item on a first plane in the three-dimensional graphical space, and displaying the plurality of menu items other than the one selected item on a second plane in the three-dimensional graphical space;

animating the first and second planes moving away from each other in the three dimensional space, wherein animating the first and second planes comprises pivoting the first plane around a first hinge axis in the three-dimensional space and a second plane around a second hinge axis in the three-dimensional space, and wherein, when the animation is completed, the first plane has a more prominent display position than the second plane.

26. The computer readable medium of claim 25, wherein said first hinge axis is different from said second hinge axis.

27. The computer readable medium of claim 25, wherein animating the first and second planes comprises moving the first and second planes in a Z-dimension of the three-dimensional space without altering X and Y dimensions of content on either the first or second plane.

28. A user interface stored as executable instructions in a memory of a computer system and displayable on a display device connected to the computer system, said user interface comprising:
   in a first state:
      a first plurality of selectable menu items on a single simulated plane in a three-dimensional graphical space, wherein a user can highlight one of the first plurality of selectable menu items at a time with a selection cursor, and
      a second plurality of menu items that remain corresponding to the highlighted one of the first plurality of menu items, wherein the second plurality of menu items change to remain corresponding to the highlighted one of the first menu items if the user moves the selection cursor from a first menu item to a second menu item; and
   in a second state:
      a first graphically simulated plane having a user selected one of the first plurality of menu items and the second plurality of menu items corresponding to the selected one of the first plurality of menu items; and
      a second graphically simulated plane having the remaining first plurality of menu items other than the user selected one of the first plurality of menu items, wherein the first graphically simulated plane has a more prominent appearance than the second graphically simulated plane,
   wherein the user interface animatedly transitions from the first state to the second state, wherein said transition comprises pivoting the first graphically simulated plane on a first hinge axis and the second graphically simulated plane on a second hinge axis, when the user moves the selection cursor to highlight one of the second plurality of menu items.

* * * * *